(12) United States Patent
Schramm et al.

(10) Patent No.: US 8,886,652 B2
(45) Date of Patent: Nov. 11, 2014

(54) METHOD FOR SEARCHING OBJECTS IN A DATABASE

(75) Inventors: Andreas Schramm, Berlin (DE); Thilo Ernst, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 413 days.

(21) Appl. No.: 13/264,733

(22) PCT Filed: Apr. 19, 2010

(86) PCT No.: PCT/EP2010/055128
§ 371 (c)(1),
(2), (4) Date: Oct. 14, 2011

(87) PCT Pub. No.: WO2010/119137
PCT Pub. Date: Oct. 21, 2010

(65) Prior Publication Data
US 2013/0066880 A1 Mar. 14, 2013

(30) Foreign Application Priority Data
Apr. 17, 2009 (EP) .................. 09 158 188

(51) Int. Cl.
*G06F 17/30* (2006.01)
*G01C 21/36* (2006.01)
*G01C 21/32* (2006.01)

(52) U.S. Cl.
CPC ...... *G06F 17/30241* (2013.01); *G01C 21/3611* (2013.01); *G01C 21/32* (2013.01)
USPC ...................................................... 707/741

(58) Field of Classification Search
CPC .......... G06F 17/30241; G06F 17/3087; G06F 9/4435; G06F 17/30324
See application file for complete search history.

(56) References Cited

U.S. PATENT DOCUMENTS 5,644,763 A * 7/1997 Roy ..................................... 1/1
6,282,540 B1 * 8/2001 Goldensher et al. .......... 707/724

(Continued)

FOREIGN PATENT DOCUMENTS

| CN | 1567174 A | 1/2005 |
| CN | 1959670 A | 5/2007 |

(Continued)

OTHER PUBLICATIONS

Ann et al, "Categorized Dara search methid for intelligent query processing" 2005 International Conference on Wireless Networks, Communications and Mode Computing.*

(Continued)

*Primary Examiner* — Wilson Lee
*Assistant Examiner* — Loc Tran
(74) *Attorney, Agent, or Firm* — Maschoff Brennan

(57) ABSTRACT

The invention provides a method for searching objects in a database by means of an index data structure which associates object attribute values to collections of spatial elements— such as tiles of a quadtree or cuboids of an octtree—defined to partition a space, herein a predefined number of spatial elements being combinable to a next-level spatial element. The method comprising: searching the index data structure for a first input search pattern and, if the first input search pattern is associated to a first collection of spatial elements through the index data structure, including all spatial elements from the first collection into a first candidate set of spatial elements, wherein, if the number of spatial elements in the first candidate set exceeds a predetermined maximum, some or all of the spatial elements are combined to a reduced number of next-level spatial elements; searching the index data structure for a second input search pattern and, if the second input search pattern is associated to a second collection of spatial elements through the index data structure, including all spatial elements from the second collection into a second candidate set of spatial elements, wherein, if the number of spatial elements in the second candidate set exceeds a predetermined maximum, some or all of the spatial elements are combined to a reduced number of next-level spatial elements; forming, from of the first candidate set and the second candidate set, a combined candidate set of spatial elements; and searching, in the combined candidate set of spatial elements, for objects that match the first input search pattern and the input second search pattern to obtain a set of result objects.

30 Claims, 14 Drawing Sheets

(56) References Cited

U.S. PATENT DOCUMENTS

| | | | |
|---|---|---|---|
| 6,934,634 B1 | 8/2005 | Ge | |
| 7,143,098 B2 * | 11/2006 | Chen et al. | 1/1 |
| 7,321,890 B2 | 1/2008 | Tropf | |
| 7,376,642 B2 * | 5/2008 | Nayak et al. | 1/1 |
| 7,539,153 B1 * | 5/2009 | Liang et al. | 370/255 |
| 7,725,425 B2 * | 5/2010 | Smartt | 707/770 |
| 8,180,763 B2 * | 5/2012 | Freedman et al. | 707/713 |
| 2003/0220916 A1 | 11/2003 | Imaichi et al. | |
| 2005/0210021 A1 | 9/2005 | Miyazaki et al. | |
| 2006/0101503 A1 | 5/2006 | Venkataraman et al. | |
| 2006/0101504 A1 | 5/2006 | Aravamudan et al. | |
| 2006/0294136 A1 | 12/2006 | Wu | |
| 2007/0005563 A1 * | 1/2007 | Aravamudan et al. | 707/2 |
| 2008/0016037 A1 | 1/2008 | Enomoto et al. | |
| 2008/0040384 A1 | 2/2008 | Kuznetsov | |
| 2008/0168039 A1 * | 7/2008 | Carpenter et al. | 707/3 |
| 2009/0019028 A1 | 1/2009 | Norris et al. | |
| 2009/0216716 A1 * | 8/2009 | Punaganti Venkata et al. | 707/3 |

FOREIGN PATENT DOCUMENTS

| | | |
|---|---|---|
| EP | 1 256 871 A2 | 11/2002 |
| EP | 1 533 721 A2 | 5/2005 |
| EP | 1533721 A2 * | 5/2005 |
| JP | 02-297290 A | 7/1990 |
| JP | 04-102969 A | 4/1992 |
| JP | 04-247556 A | 9/1992 |
| JP | 11-232285 A | 8/1999 |
| JP | 2001-325299 A | 11/2001 |
| JP | 2003-345811 A | 12/2003 |
| JP | 2009-537906 A | 10/2009 |
| JP | 2009-543224 A | 12/2009 |
| JP | 2007-233658 A | 9/2013 |
| KR | 2007 01 00 710 A | 10/2007 |
| KR | 2007 01 00 711 A | 10/2007 |
| WO | 2007/134278 A2 | 11/2007 |
| WO | 2008/086281 A2 | 7/2008 |
| WO | 2009/009518 A1 | 1/2009 |

OTHER PUBLICATIONS

Seong-Woo Ann et al., Categorized Data Search Method for Intelligent Query Processing, 2005 International Conference on Wireless Networks, Communications and Mobile Computing, Jun. 13-16, 2005, Maui, HI, US, vol. 2, 901-905, IEEE, Piscataway, NJ, US.

Tropf et al., "Multidimensional Range Search in Dynamically Balanced Trees", Applied Informatics, Feb. 1981, pp. 71-77, Germany.

Japan Office Action dated Jan. 7, 2014 in application No. 2012-505186. (English Translation).

* cited by examiner

METHOD FOR SEARCHING OBJECTS IN A DATABASE

CROSS-REFERENCE TO A RELATED APPLICATION

This application is a National Phase Patent Application of International Patent Application Number PCT/EP2010/055128, filed on Apr. 19, 2010, which claims priority of European Patent Application Number 09158188.4, filed on Apr. 17, 2009.

BACKGROUND

The invention relates to a method for searching objects in a database.

The invention in particular relates to map searching on mobile (navigation) devices. GPS-based mobile navigation systems are nowadays well established, in particular as so called personal navigation devices (PND) or, increasingly, as software navigation applications on mobile telephones, in particular smart phones, as a whole referred to as navigation devices in the following.

Although increasingly networked navigation solutions within the smart-phone segment play a role (so called connected navigation; for example mobile clients for internet-based map services), the majority of navigation solutions are designed to work in an autarkic manner in that they do not require a (permanent or frequent) network connection (so called offline navigation). This is advantageous on the one hand because of the high costs of network connections, on the other hand because network connections are not always available, especially while travelling, due to limited network coverage in (rural) parts of a country or different network setups in different countries.

An autarkic mobile navigation device must contain the entire map material, typically in a highly compressed form on a data storage medium such as a Flash memory card (for example an SD-card) or the like. Within a navigation device, one of the crucial user interaction operations is the input of and search for an arbitrary object in a map, for example a street address or a particular point of interest (POI), e.g. to enable a user to define the destination of a navigation route. Herein, the complexity of the input operation, in particular the number of required key strokes or selections, possible waiting times and the quality of the interactive feedback, determine the usability of the system and the satisfaction of a user.

Conventional navigation devices in general offer two possibilities to find and locate objects in a map.

On the one hand, a user can determine a destination by interactively moving (panning) and zooming a map segment displayed on a mobile navigation device and, thus, arriving at a map region which contains the destination, such that the destination can be determined by choosing (picking) the destination with a pointer (for example a touch-sensitive screen). This process, however, is tedious, and waiting times may occur due to hardware restrictions of the (mobile) navigation device. In addition, such process is often not practical, because a user must beforehand have a rather precise knowledge about where to find a destination geographically in a map—which often is not the case.

Therefore, navigation devices conventionally offer, on the other hand, a text-based search function by which a user can locate an object according to its name (for example, a street name or the name of a point of interest).

On a stationary computer, such as a desktop computer or a server, it in general poses no problem to exhaustively search the entire stored data records of all available map material. Therefore, such search function is supported by many geo-information systems (GIS) and geo-database software products.

Internet-based map services (such as, in these days, Google maps) optimize search functions in terms of user friendliness and, therein, use functions known from internet search engines. They allow a free text search which compares multiple search terms entered by a user to all attributes of all objects in a map. The search results are then sorted and displayed according to their relevance. Such solutions and there fundamental algorithms, however, cannot be applied within conventional mobile navigation devices, because neither the main memory nor the processor of such navigation devices suffices for the execution of such software applications. Furthermore, the memory of such navigation devices does not provide enough memory space to hold the required standardized map formats (not being compressed or being compressed only insignificantly) and to store additional data files being generated during a data base search (for example data base index files) and being required for the execution of the software.

Because of such limitations, conventional mobile navigation devices provide only simple options for a text-based search. The search process, herein, in general requires a hierarchical geographical confinement, during which a user first must select a region (e.g. country and/or city) and finally a street address or a different search term (such as a name of a point of interest). Only after entering the region, a search for possible street addresses or other search terms is carried out, because conventional search algorithms do not, due to the present hardware limitations of common mobile navigation devices, allow a free text search over all regions of the map in the manner of internet-based map services.

SUMMARY

It is an objective of the invention to provide a method and a navigation device that allows a free text search for objects within map data of a mobile navigation device.

A method for searching objects in a database by means of an index data structure is provided. Each of the objects, herein, has a two-dimensional or three-dimensional spatial location and can be matched against a search pattern. The index data structure associates object attribute values, such as names of objects, to collections (sets) of spatial elements—such as tiles of a quadtree or cuboids of an octtree—defined to partition a space, especially a two-dimensional plane or a three-dimensional space. A predefined number of spatial elements are combinable to a next-level spatial element.

During the method, the index data structure is searched for a first input search pattern and, if the first input search pattern is associated to a first collection of spatial elements through the index data structure, all spatial elements from the first collection are added to a first candidate set of spatial elements. Herein, if the number of spatial elements in the first candidate set exceeds a predetermined maximum, some or all of the spatial elements are combined to a reduced number of next-level spatial elements.

Concurrently while or sequentially after the searching of the index data structure for the first input search pattern, the index data structure is searched for a second input search pattern and, if the second input search pattern is associated to a second collection of spatial elements through the index data structure, all spatial elements from the second collection are added to a second candidate set of spatial elements. Again, if the number of spatial elements in the second candidate set exceeds a predetermined maximum, some or all of the spatial elements are combined to a reduced number of next-level spatial elements.

When the first candidate set and the second candidate set have been obtained, the intersection of the first candidate set and the second candidate set are formed to obtain a combined candidate set of spatial elements. This combined candidate set is then searched in an exhaustive manner for objects that match the first input search pattern and the second input search pattern to eventually obtain a set of result objects which match all of the input search patterns.

The invention allows for a very efficient computing of candidate sets. Especially for inexpressive search patterns (e.g. short search words that occur in very many objects) candidate sets obtained when using conventional methods may be large, and both their representation as in—core data structures and their combined processing (for example to compute their intersection during the search process) are impractical on hardware platforms with restricted resources (such as mobile navigation devices). The invention allows to both represent large candidate sets of spatial elements using only a small amount of memory and to process the candidate sets with small computational effort. Even in cases where two candidate sets are each very large, their intersection may have a comparatively small cardinality such that the resulting combined candidate set can not only be efficiently determined, but is also small enough to be exhaustively searched for result objects matching all input search patterns. In effect, with the provided method it becomes possible on constrained hardware platforms to efficiently determine search results even for very inexpressive search patterns such as those occurring at the early stages of an interactive user input.

In this context, an input search pattern is a pattern that may be input interactively by a user and may be a text string containing alphabetic characters and/or numeric digits.

For the purpose of searching for objects, the method is not limited to one or two input search patterns. Just as well, three or more search patterns may be input by a user, and combined candidate set is determined by intersecting all candidate sets associated with the search patterns in any order permitted by the laws of set theory.

A collection of spatial elements is a set containing one or multiple spatial elements being associated with an attribute value of an object, such as a name of an object.

The index data structure associates object attribute values with, for example, collections of spatial elements of a quadtree that is used to partition a two-dimensional plane. In the quadtree, each spatial element corresponds to a tile, i.e. a rectangular segment of the two-dimensional plane, wherein four adjoining tiles can be combined to one next-level tile forming a next-level spatial element whose area covers the four original tiles.

In general, a quadtree is defined as a tree in which every non-leaf node has four children. Here, a quadtree of uniform depth may be employed.

The index data structure can have the structure of a so called trie, which constitutes a tree whose edges are labelled with non-empty strings and whose nodes are labelled by the concatenation of the edge labels of the path from the root to the node. The root itself is, for example, labelled with an empty string.

For the combination of spatial elements within the first candidate set or within the second candidate set of spatial elements, four or less adjoining tiles are combined to one next-level tile, this combination representing a secure compactification in which the area of the next-level spatial element represents an (improper or proper) superset of the combined spatial elements.

By searching the index data structure for the first input search pattern or the second input search pattern, it is examined whether the first input search pattern or the second input search pattern matches an object attribute of a spatial element. For this, each search pattern may represent a text string, i.e. a string that is formed by alphabetic characters and/or numeric digits. The text string is, during the searching, compared to the attributes (e.g. the name) of an object. If the text string matches an attribute or a prefix of an attribute (i.e. the beginning of the attribute name matches the text string), the associated collection of spatial elements are added to the respective candidate set. In other words, the index data structure is searched for an input search pattern by searching it for all index keys having a prefix match against the search pattern (i.e. index keys that start with the characters or digits contained in the search pattern). For all these index keys, if an index key is associated to a collection of spatial elements through the index data structure, all spatial elements from this collection are added to the candidate set of spatial elements, wherein, if the number of spatial elements in the candidate set exceeds a predetermined maximum, some or all of the spatial elements are combined to a reduced number of next-level spatial elements.

By this technique, a compactified set union of all candidate sets associated to all keys in the index data structure matching the search pattern can incrementally and efficiently be constructed and has a memory representation of manageable, limited size.

In an exemplary embodiment of the invention, for the searching of an input search pattern in the index data structure an auxiliary index data structure can be used which associates object attribute values or prefixes of object attribute values to auxiliary candidate sets that have been assembled previously through the index data structure. Herein, if the searching in the auxiliary index data structure yields a nonempty set, this set yields the desired candidate set. Otherwise the desired candidate set is obtained by searching the (main) index data structure for the input search pattern.

In this way, the efficiency of the method can further be improved. For each search pattern for which an associated candidate set is to be determined, rather than searching the complete main index data structure, another auxiliary index data structure is used which associates a subset of the possible object attribute value prefixes with pre-compactified, pre-assembled candidate sets. The pre-compactification herein is done, as described previously, by combining spatial elements to a reduced number of next-level spatial elements, but takes place at the time the auxiliary index data structure is generated, i.e. before a search query is processed. If the search in the auxiliary index data structure yields a nonempty set, the desired candidate set is complete. Otherwise the desired candidate set is computed by searching in the (main) index data structure. This method allows to determine candidate sets even for very inexpressive search patterns, for instance search strings just containing a single character. For such cases the search for a prefix in the main index data structure is not very efficient, since many prefix matches against the search pattern are found in the index data structure, resulting in a need to consider many associated collections of spatial elements for inclusion in the candidate set. With the suggested modification, a large number of collections is replaced by a much smaller number of limited-size collections provided by the auxiliary index data structure.

The database, for the use within a navigation device, may contain digital map data of a geographical map. In that case, the objects correspond to geographical objects of the map data, e.g. streets and points of interest, and the two-dimensional plane corresponds to a geographical map to be displayed by the navigation device. The index data structure then associates names of geographical objects to approximate sets of tiles in which a name represents an attribute of a geographical object. The tiles result from a hierarchical quadtree partitioning of an overall map, for example of a map of a continent, and are numbered using a specific binary numbering scheme. The search takes place in that the index data structure is queried with one or multiple input search patterns. From this a set of tiles results that contain objects in which the search patterns occur as attributes. For a conjunctive search, i.e. a combined query for multiple input search patterns (logical AND-conjunction), the intersection of the candidate sets of the single input search patterns is formed. The resulting combined candidate set then is searched exhaustively in a second step for objects that contain all input search patterns as attributes.

The concept allows for an easy reduction of the candidate sets for all names that contain a common prefix (beginning of a word). Thereby an efficient conjunctive multi-prefix search becomes possible. To obtain a candidate set associated with a prefix the combined set of the candidate sets of all possible continuations of the prefix is formed. The use of the index data structure and a persistent representation of the associated candidate sets in substance reduce this process to a sequential read-in of elements that are incrementally added to a work set in a main memory.

To be able to carry out the method also for large candidate sets on mobile devices, it is necessary to represent (large) sets of tiles in a memory-efficient way for applying operations to the sets in a computationally efficient way. The specific representation herein is based on a numbering scheme for the tiles and on the fact that predetermined quadratic patterns from small tiles can equivalently be represented by larger next-level quadtree tiles. By combining the tiles, the number of the tiles to be stored decreases and the representation is "compactified".

Both an equivalent compactification (in which in each case four tiles are combined to the associated next-level tile) and a secure approximate compactification (in which four or less tiles are combined to an associated next-level tile and the area represented by the next-level tile is a superset of the area covered by the original tiles) can be used. The secure approximate compactification is, for the purpose of the search, secure in that it leads at most to an increase of the number of tiles contained in a candidate set, meaning that in the end possibly additional tiles must be examined exhaustively in which no real candidate objects are located, but at the same time it is excluded that the inaccuracy of the representation results in leaving out true candidates.

In a preferred exemplary embodiment of the method, when interactively inputting the first input search pattern and/or the second input search pattern the combined candidate set is incrementally reduced. Basis for this is that, if a combined candidate set is computed for a multi-prefix search query (comprising one or multiple input search patterns) and if the search query is altered by the user by adding one or more characters at the end of one or multiple search patterns or by adding one or multiple new search patterns, the new combined candidate set can be determined efficiently in an incremental way from the old combined candidate set by exploiting the laws of set theory and the fact that the candidate set associated to an extended (in the way just described) prefix is always a subset of the candidate set associated to the original prefix. Only a single intersection operation for each altered or added search pattern is required. In this intersection operation, the new candidate set obtained from the new or altered search pattern is intersected with the old combined candidate set. The cardinality of the combined candidate set in each case is decreased or, to the least, does not increase.

In a further exemplary embodiment, when interactively inputting the first input search pattern and/or the second input search pattern, a feedback about the expressiveness of the combined candidate set is provided, wherein the expressiveness increases if the cardinality of the combined candidate set decreases. A feedback, for example, can be provided if the cardinality of the combined candidate set becomes smaller than a predetermined threshold value.

The feedback can be provided in a visual way via a display, but also acoustically via a loudspeaker or haptically via an haptic output device (for example generating vibrations).

The specific structure of the index data structure allows, after each input of a search query or the altering of a stored search query, for a fast estimation and evaluation of the expressivity of the search query (consisting of one or multiple input search patterns), i.e. the capability of a search query to limit the search region. A search query, in this context, has a high expressivity if the resulting combined candidate set comprises a small (but positive) cardinality.

The specific persistent structure of the index data structure makes it possible to estimate the cardinality of a combined candidate set with good accuracy without performing a complete count of the spatial elements contained in the set. By this, it becomes possible also for mobile navigation devices with limited resources to give an instant feedback about the actual expressivity of a search query to a user when inputting or altering the search query.

For example, a display of a navigation device may be set up to change a red background colouring of a displayed input window to yellow if the search query becomes sufficiently expressive to obtain a combined candidate set that can be searched exhaustively with reasonable computational effort. If the user, in this case, does not continue the input, a result list containing the result objects found in the spatial elements of the combined candidate set is output (possibly after a waiting time for the exhaustive search within a comparatively large number of spatial elements). In general, the probability that the wanted destination object is contained within the result list is rather limited due to the limited expressivity of the search query. If, however, the user continues the input, the colouring is changed to green once the estimated cardinality of the combined candidate set associated with the altered search query becomes smaller than a substantially smaller, predefined threshold value. In this case, having obtained a combined candidate set with a small cardinality, the exhaustive search of the spatial elements associated with the combined candidate set can be performed in a fast and efficient manner and, because of the high expressivity of the search query, there is a large chance that the wanted destination object is present in the obtained result list of found objects.

The expressivity estimation also allows for an instantaneous identification of inputs that are not associated with any tiles. In this case, the cardinality of the combined candidate set assumes a value of zero. A cardinality of zero usually results from typing errors in the input search patterns such that no matching object attributes are found in the index data structure and an empty candidate set results. Such typing errors, accordingly, can be indicated immediately by an appropriate feedback, for example by a visual, acoustical or haptical alarm (such as a red blinking of the input window).

To ensure an efficient search, the exhaustive search for result objects in the combined candidate set of spatial elements is carried out only after the cardinality of the candidate set has become smaller than the predetermined threshold value. During or after the exhaustive search the result objects are output via an output device, for example a display of the navigation device.

To limit the computational effort (and the associated elapsed waiting time perceived by a user) of the exhaustive search for objects in the combined candidate set of spatial elements, one or multiple of the following measures can be taken:
- the number of spatial elements that have already been searched is counted and the process is stopped when a pre-defined limit is surpassed or
- the number of objects that have already been found is counted and the process is stopped when a pre-defined limit is surpassed or
- the elapsed time for the searching is measured and the process is stopped when a pre-defined time limit is surpassed.

Herein, the exhaustive search for objects in the combined candidate set is started or re-started after each user input that adds or alters a search pattern and after computing a new combined candidate set resulting from the new or modified search query.

The exhaustive search for objects may be done, in this context, in two or more phases corresponding to levels of the index data structure, starting from a higher (more coarse) level and progressing to one or more finer levels. In the first phase, the tiles of a higher level (in the quadtree) are exhaustively searched. Such tiles may not contain all information of the tiles in lower levels, but only the most important information (such as names of large cities or very important points of interest). The search in the first phase therefore is coarse, since not all information is regarded. In the next phase, the tiles of a lower level may then be searched, until in a final phase the tiles at the lowest, finest level are exhaustively searched and all information contained therein is considered. In this way, the exhaustive search becomes progressively more accurate, wherein already in the early phases a list of result objects may be output to a user. Also, if the exhaustive search is stopped before completion, e.g. because a time limit is reached, it is ensured that at least the most important search results will already be displayed at this time.

In another exemplary embodiment, in addition to the main index data structure another separate index data structure may be used, which associates object attribute values to collections of spatial elements, but only does so for those object attributes which describe the region in which the object is situated (e.g. attributes like "name of surrounding city", "postal code of object", "name of surrounding country") and disregards all other attributes. This separate index data structure is, hence, limited in size and can be used to quickly identify a desired region (e.g. a city) before searching for a specific in the desired region using the main index data structure. By first searching for a region using the separate index data structure, the number of spatial elements that must be considered when searching the main index data structure for objects can be limited beforehand to those spatial elements associated to the specific region, thus reducing the computational effort for the method further.

The search may also be constrained to consider only spatial elements associated with a specific target region. If only search results from a specific region are of interest (e.g. the region around the user's current GPS position), the search method can be applied as described, but in addition the candidate set is intersected with another set of spatial elements—called the "target region set"—before performing the exhaustive search for actual matches. The target region set is constructed for this purpose as a set of spatial elements describing the target region, or approximating it by a superset. As this set normally will already have a small size, it can be used as the initial candidate set to which all further intersections are applied when incrementally computing further candidate sets according to input search patterns. If the target region set uses a very coarse approximation, result objects outside the actual target region may be filtered out and disregarded during the exhaustive search.

In a further exemplary embodiment, after the exhaustive search of the combined candidate set and after obtaining the set of result objects that match all of the input search patterns, the result objects are displayed in the order of decreasing relevance. The relevance of the objects may for example be determined using a set of heuristic rules indicating the probability that an object of the set of result objects represents an object a user actually meant to find (e.g. a destination such as s street address or a point of interest).

When displaying a list of search results it is, because of the limited display size for example on mobile navigation devices, of large importance to present the results in the order of their estimated relevance for the user such that the true destination object is with a high probability shown at the top or at least close to the top of the list. For this, a set of rules has been developed which allow evaluating the probable relevance with a high accuracy. These rules use on the one hand information arising from details of a search query entered by a user and consisting of one or multiple search patterns. On the other hand, they use information that is stored as object attributes in a map and which indicates an increased generic relevance for specific objects (such as points of interests of specific importance).

The heuristic rules may, for example,
- take into account the order of the input search patterns that a user has chosen (e.g., the first search pattern may indicate a city, the second a street),
- consider regions/cities to be more important than streets,
- consider large cities to be more important than small cities,
- consider points of interest corresponding to cities or airports more important than other points of interest,
- consider points of interest to be more important than streets and/or
- consider large streets to be more important than small streets.

Within navigation devices, the database contains map data in which objects correspond to geographic objects. In a further embodiment of the method, a geographical area corresponding to the combined candidate set of spatial elements is output when interactively inputting the first input search pattern and/or the second input search pattern. In this case, for each search query a combined candidate set of map tiles is computed and for each of such sets a geographical area corresponding to or containing the respective combined candidate set is determined. This area can for example be a rectangle whose sides are determined by the northernmost, southernmost, westernmost and easternmost edges of all tiles contained in the combined candidate set. The prompt display of a map segment representing this rectangle after input of a search query provides a fast overview of the area in which potentially the wanted destination can be found.

Preferably, herein, the display of the geographical area is updated before performing the exhaustive search of objects within the combined candidate set, which in general is computationally time consuming.

When interactively inputting the first input search pattern and/or the second input search pattern, the geographical area corresponding to the combined candidate set of spatial elements may incrementally be confined. In this way, in combination with the efficient incremental confinement of the candidate set during the input of a search query, a specific visual impression may be obtained (provided that an efficient map visualization is available) in which the progressive incremental input of the search query is accompanied by the display of a continuously zooming geographical area representing the area in which potentially the wanted destination is located. The geographical area may herein correspond to a map segment ranging from a map showing the entire continent to a small map segment containing only the destination object (or few other objects) and its immediate environment. With sufficient displaying speed and a continuous adjustment of the display scale (possibly using interpolation techniques) a visual impression is obtained similar to a zoom effect of a movie camera. To improve the speed of the map display, it is possible to substantially simplify the displayed map segment by leaving out map details of small importance, such as forest areas, or by reducing text shown in the map.

In a further exemplary embodiment, the first input search pattern and/or the second input search pattern are input via a reduced keypad in which multiple letters or digits are assigned to a key of the keypad, wherein each key has to be pressed only once per character of the input search pattern. In this way use is made of the fact that a resulting underdetermination is in general reduced by every additional input character, exploiting the statistical property that distinct, even adjacent characters of geographic names or words of a natural language are to some extend uncorrelated.

In a first exemplary variant, the input of diacritical letters (umlauts) can be avoided, which conventionally must be input via virtual or physical keypads on mobile devices using a complex sequence of steps. With this embodiment, it now becomes possible to input, as part of a search pattern, a base letter associated with an umlaut (for example an "A" for an "Ä"), wherein within the search process the umlaut as well as the base letter are considered to be a match.

In a second exemplary variant, a numeric keypad of a mobile phone (that contains a navigation application and functions as a navigation device) can be used in which multiple alphabetic letters are assigned to each numeric key (keys "0" to "9", "a", "#", to which alphabetic letters are assigned as known conventionally ("2"="ABC", "3"="DEF", . . . )). For the input of a search pattern, no multiple keystrokes are required (e.g., for a "C" the key "2" must be pressed only once). The user can in this way enter a search query in a fast way as if using a full keyboard. Typing errors, hence, become less probable than with a miniaturized full keyboard, as they are for example displayed on a touch screen. The practical implementation of the method using this concept is not more complex and the execution of the method is only slightly more costly in terms of computational power compared to the input via a full keyboard.

Within a device, a physical as well as a virtual keypad displayed on a display may be used. Within the latter, the virtual keys may be actuated using a pointing device, a directional keypad, specific trigger keys or a touch-sensitive screen.

An exemplary embodiment of the method may use a multi-phase heuristic search strategy which is based on the idea of interpreting the input search patterns of a search query in certain ways. In this context, for a specific interpretation a so called role is assigned to each input search pattern of a search query entered by a user.

The underlying idea originates from the following observation: When a user enters a certain search query with the intent of finding a specific target object in a database (e.g. in a geographical map), this means that in his or her opinion it likely is possible to uniquely identify the target object based only on this search query—and this will often (albeit not always) be actually the case.

Now, even though the user normally will not explicitly think about this in detail, he or she would, when asked, usually be able to explain how this search query can be understood in a way that clearly identifies the target object. So the method "just" needs to be able to "guess" this interpretation.

This is done by interpreting an input search query in a certain way by assigning a role to each of the input search pattern of the search query.

Possible examples for a specific role are: "the search pattern occurs in a region attribute of the object" or "the search pattern must be the first word of the object's name". Hence, the term "role" in this context is to be understood as referring to a possible property of the input search pattern that a user may have in mind. For example, if a user enters a search query "BER HUS", the first input search pattern ("BER") may be interpreted as indicating a region attribute of an object (e.g. the city of Berlin), and the second input search pattern ("HUS") may be interpreted as referring to the object's name (e.g. the object "Husemannstraße", a street in Berlin). Other interpretations of course are possible.

The interpretation of a search query by assigning roles to its search patterns may be used to limit the search space. I.e. for a specific interpretation of a search query possibly not the entire search space of the database, e.g. defined by the partitioned map data, needs to be searched, but only a limited search space. For the above example, if "BER" is interpreted as a region attribute, a (limited auxiliary) index data structure considering only region attributes is used to only search the attributes of an object related to the region (i.e. the region attribute).

In an exemplary embodiment of the method, hence, the first input search pattern and/or the second input search pattern may heuristically be interpreted to have pre-defined roles, a role herein indicating a possible underlying meaning of the respective input search pattern.

By heuristically interpreting the first input search pattern and/or the second input search pattern, then, a role-specific heuristic candidate set can be computed for each input search pattern, and by intersecting the role-specific heuristic candidate sets a combined heuristic candidate set for a specific interpretation of a search query is obtained.

Within the method, in a first phase for one or several different interpretations of a search query in each case a combined heuristic candidate set is computed and exhaustively searched, and in a second phase the combined candidate set without constraining the search query to a specific interpretation is computed and exhaustively searched.

The search hence is separated into different phases. First, several possible interpretations of a search query are considered, each yielding a very small fraction of the search space which can be exhaustively searched quickly and has a good chance of containing the desired result. Second, the method falls back to a general interpretation which yields a larger search space but which is guaranteed to contain the desired result if it exists in the database at all. If a resource limit is reached during exhaustive searching, the search engine aborts the search process and notifies the application, so it can encourage the user to supply more expressive input.

As already mentioned, an interpretation assigns a specific role to each of the input search patterns. Since there are many possible combinations of the different roles yielding different interpretations of the input search query, the different interpretations are first enumerated symbolically without computing the associated role-specific heuristic candidate sets and combined heuristic candidate sets. Then, those interpretations are not further considered for which one or more of the role-specific heuristic candidate sets are detected to be empty through a look-up in the index data structure. In other words, within an embodiment of the method, all nonempty interpretations are enumerated and ordered before computing any actual candidate sets, so the interpretations which can be expected to yield smaller candidate sets (and possibly yield the desired result) come first. In this context, an interpretation is called empty for a given search query if any search pattern of the search query in its assigned role yields an empty role-specific heuristic candidate set. This would automatically cause the interpretation's combined heuristic candidate set to be empty, so it is not necessary to consider such interpretations any further.

In this regard, the selection of different interpretations to be considered for an input search pattern, or the symbolical enumeration of the different interpretations, can be determined according to the estimated cardinality of one or more role-specific heuristic candidate sets obtained through a lookup in an index data structure.

The idea of assigning certain roles to input search patterns of a search query and to improve the efficiency of a search by searching a database according to a search query containing search patterns with specific roles is also separately applicable. Hence, a method for searching objects in a database by means of an index data structure which associates database object attribute values to collections of elements—for example to tiles of a quadtree, to cuboids of an octtree, to nodes of a binary tree, to documents, to files, or to numbers or other codes identifying certain documents or files, or to data structures containing any of the previously mentioned information and one or more occurrence positions of the attribute value within a spatial element, document or file—, comprises:

within an input search query, heuristically interpreting a first input search pattern and/or a second input search pattern to have pre-defined roles, a role herein indicating a possible underlying meaning of the respective input search pattern with regard to an object attribute value;

by heuristically interpreting the first input search pattern and/or the second input search pattern, computing a role-specific heuristic candidate set of elements for each input search pattern by means of the index data structure, the role-specific heuristic candidate set containing those collections of elements that contain objects at least one attribute value of which matches the input search pattern in its pre-scribed role;

intersecting the role-specific heuristic candidate sets for the first input search pattern and the second input search pattern to obtain a combined heuristic candidate set for a specific interpretation of the search query; and identifying, in the combined heuristic candidate set of elements, objects that match the first input search pattern and the input second search pattern, thus obtaining a set of result objects.

In an exemplary embodiment of this method, in a first step for several different interpretations of a search query in each case a combined heuristic candidate set is computed and exhaustively searched, and in a second step a combined candidate set without constraining the search query to a specific interpretation is computed and exhaustively searched.

With regard to the background and advantages of this method it is referred to the above.

In general, for the different embodiments of the method the computational effort for computing candidate sets for input search patterns with low expressiveness may be reduced by employing an auxiliary index data structure to provide pre-compactified candidate sets for certain input search patterns, the auxiliary index data structure always being probed before the main index data structure is employed. I.e. for certain very inexpressive search patterns (such as single characters or search patterns with only two characters) first an auxiliary index data structure is looked up in which those inexpressive search patterns are associated with pre-defined collections of spatial elements that likely may contain the desired object corresponding to the input search pattern. The background for this is that, if a user deliberately enters a short, inexpressive search pattern, chances are high that the user considers this search pattern to actually point towards the desired object, because for example the search pattern is exactly contained in the object's name or region attribute (e.g. if there is a street called "P-Street", a user may be looking for this if he enters "P"). If it is pre-stored in the auxiliary index data structure for example which spatial elements contain objects having attributes exactly matching the (inexpressive) input search pattern and the auxiliary index data structure is looked up prior to the (main) index data structure, by exhaustively searching the resulting candidate set of spatial elements the desired result may be found quickly without having to exhaustively search a large number of spatial elements.

In a further exemplary embodiment of the method, candidate sets and combined candidate sets (including also for example role-specific heuristic candidate sets and combined heuristic candidate sets as mentioned above) may be stored in a cache memory database after they have been first computed for a given input search pattern. In this way the computational effort for computing candidate sets for input search patterns can be reduced, because the candidate sets need not be re-computed if needed multiple times during different steps of a search, but rather are obtained from the cache memory.

The index data structure may, in a further refinement of the method, have entries not only for the exact values of an object attribute, but additionally for predefined variations of these values, which may substitute certain characters by other characters or may add certain characters to the original value or may omit certain characters from the original value or may exchange the positions of some characters with respect to their positions in the original value. This allows for a so called fuzzy search, allowing for example to find the desired result also if one or multiple of the input search patterns do not (exactly) match an object attribute value, e.g. the object's name or the region attribute. In this way the desired result may be found for example also if there is a spelling error in an input search pattern.

In another exemplary embodiment, the first and/or the second candidate set for the first and the second input search pattern may be extended by including spatial elements into the first and second candidate set that adjoin the spatial elements already present in the first and second candidate set before the first and the second candidate set are combined. In this way also spatial elements neighbouring the spatial elements of the determined candidate set are included into the search.

In another exemplary related refinement of the method, a so called fuzzy search is supported by generating one or more modifications of a user-specified search pattern, e.g. by substituting certain characters by other characters, or by adding certain characters to the original search pattern, or by omitting certain characters from the original value, or by exchanging the positions of some characters with respect to their positions in the original search pattern. In this refinement, the index data structures according to the instant method are used to identify a subset of such search pattern modifications which will be further considered, and to obtain one or more candidate sets or role-specific candidate sets for the selected modifications. These sets are then used individually or after building their set union, in further steps according to the instant method, such as the determination of combined candidate sets.

In yet another exemplary refinement of the method, the first and second search pattern may be input through a medium such as a voice input device or another subsystem, yielding a multitude of search query variants each consisting of several input search patterns instead of a single search query, and wherein the cardinality of candidate sets computed for search patterns from the search query variants or combined candidate sets computed for search query variants is used to guide the selection of a subset of search query variants for further processing or to guide the assignment of priorities to the individual search query variants influencing the order of their further processing. Hence, by considering different search query variants that may correspond to the (indefinite) input (using for example a voice input) the desired result can be found easily and in an efficient way, especially when taking the cardinality of the candidate sets resulting from those variants into account, for example by processing first the search query variant yielding the smallest cardinality candidate set.

In yet another exemplary refinement of the method, the search patterns may be input through a medium such as a hand writing recognition device or subsystem, where certain input characters are difficult to reliably differentiate during input, e.g. the letters "O" and "Ö" and the digit "0", so there is a risk that the wrong variant of the symbol occurs in the input search pattern presented to the instant method. In this refinement, the symbols for which this ambiguity may occur are identified before the index data structures are generated, and the ambiguity is treated as follows: From each set of symbols which cannot be reliably differentiated, a unique representative is chosen (e.g. the letter 'O'), called the canonical representative. Both during index generation and during exhaustive search, all occurrences of the other variants of the symbol (e.g. character 'Ö' and digit '0') are replaced by the canonical representative. In other words, they are treated as if they would occur on a reduced keypad where the digit-"0" key is also overloaded with the characters "O" and "Ö".

In another exemplary modification of the method, the estimated cardinality of one or more candidate sets, obtained through a (computationally inexpensive) lookup in an index data structure, is used as a measure of expressivity of an input search pattern or multitude of input search patterns. Using the cardinality, the selection of database segments or (internal or external) databases to be included in further processing steps, or the assignment of priorities to such databases or database segments, influencing the order of their further processing, may be controlled.

The user's final selection of a search result for further processing (e.g. the selection of a destination for the route computation in a navigation application) may be registered in a persistent storage medium to be used for future search processes. Thus, a self-learning system is provided in which previously selected search results may be assigned a larger priority and may be displayed at or close to the top of the actual result list of a later search.

In yet another exemplary embodiment, as results of the exhaustive search of the combined candidate set of spatial elements not only objects are registered whose attributes match all input search patterns of the input search query, but also such objects for which one or more input search patterns do not match an object attribute. Hence, a so called word-level fuzzy matching is implemented yielding as results not only objects whose attributes exactly match the search query, but also such objects that may not have a match with regard to one or some of the input search patterns.

The index data structure and the associated collections of spatial elements may, in another modification, not be generated from the database which will actually be searched using the index data structure, but from a larger, superior database which contains all or most of the objects of the database that will actually be searched.

In the above, the method according to the invention has been described with focus to index data structures that associate object attribute values to collections of two-dimensional spatial elements (tiles) of a quadtree, as they are advantageously used when dealing with two-dimensional maps in a navigation device. However, the method may just as well be applied for searching objects in a three-dimensional space, for example for a navigation device in a three-dimensional space (for example for aviation or aeronautic applications). In this case the index data structure associates object attribute values with collections of spatial elements of an octtree in which each spatial element corresponds to a cuboid and eight adjoining cuboids are combinable to one next-level cuboid representing a next-level spatial element. The embodiments and variants described above apply in an analogous manner also to such index data structures.

Possibly, the method may also be applied to spaces of higher dimensions or also to one-dimensional space. In general, the method may use index data structures that associate object attribute values to collections of spatial elements of a kd-tree, where k may be any natural number (k=1, 2, 3, 4, 5, . . . ).

In the one-dimensional case, the index data structure associates object attribute values with elements of a binary tree interpreted as a kd-tree with k=1, i.e., each tree node represents an interval from a one-dimensional linear space. Two adjoining intervals are combinable to one next-level interval, represented by a next-level tree node. In this case, each interval is to be understood as a spatial element partitioning the one-dimensional space.

The objective is further achieved by a navigation device which is arranged to run a method as it has been described in the foregoing, or by any other mobile computing device arranged to execute said method.

BRIEF DESCRIPTION OF THE DRAWINGS

Subsequently, the idea underlying the invention shall be explained further with reference to the embodiments shown in the figures.

DETAILED DESCRIPTION

Figure 1:
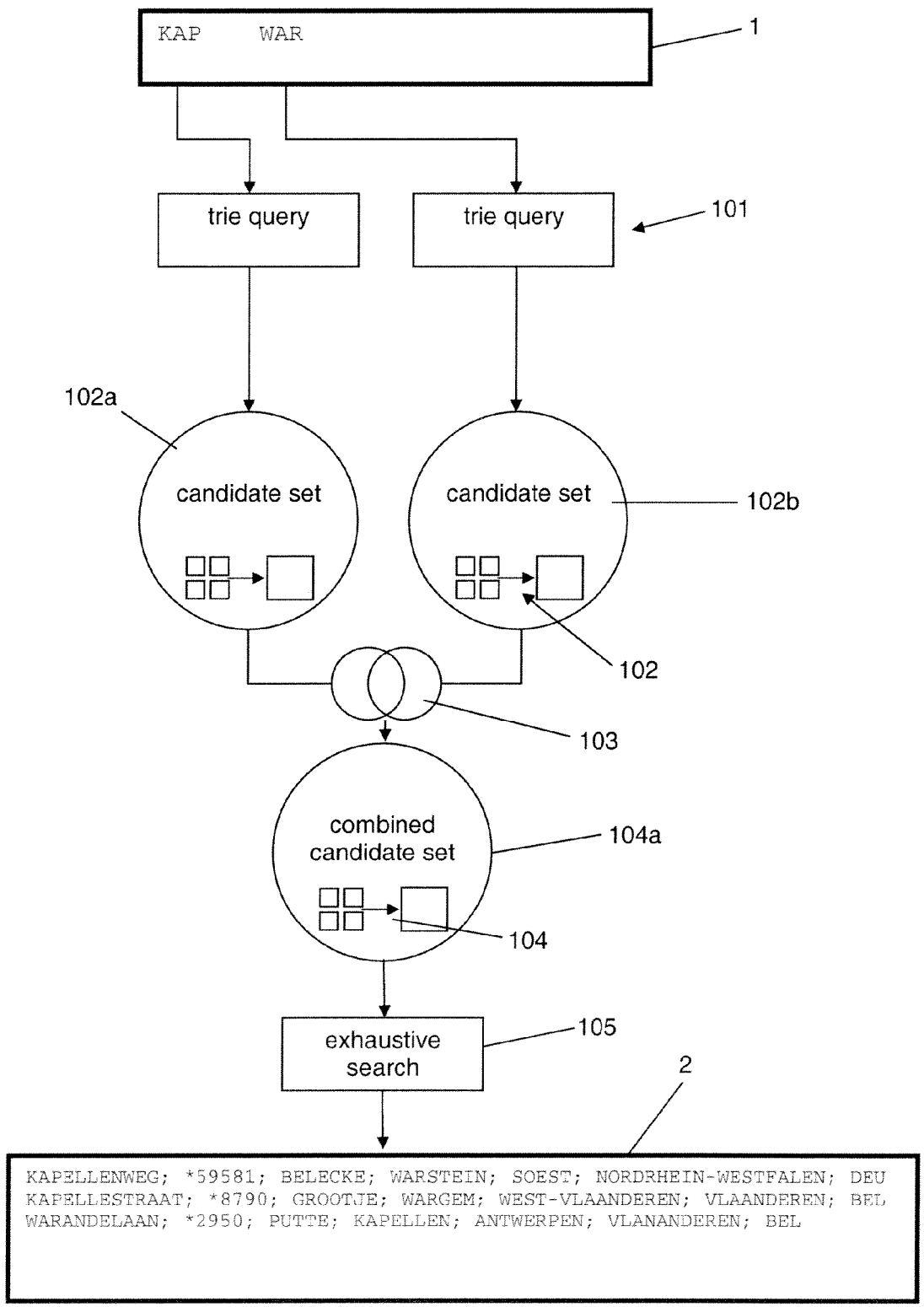
FIG. 1 shows a flow diagram of a method for searching objects in a database by means of an index data structure.

FIG. 1 gives, in a flow diagram, an overview of an embodiment of a method to find and locate objects in a database. In the embodiment, the method is applied to a navigation device, the objects represent geographical objects of a two-dimensional map and the data stored in the database is digitally stored geographical map data.

The navigation device may, for example, be a dedicated mobile navigation device or a mobile phone, mobile computer, personal digital assistant (PDA), mobile internet device (MID), portable media player (PMP), or other mobile computing device, on which a navigation software application is implemented.

Figure 2:
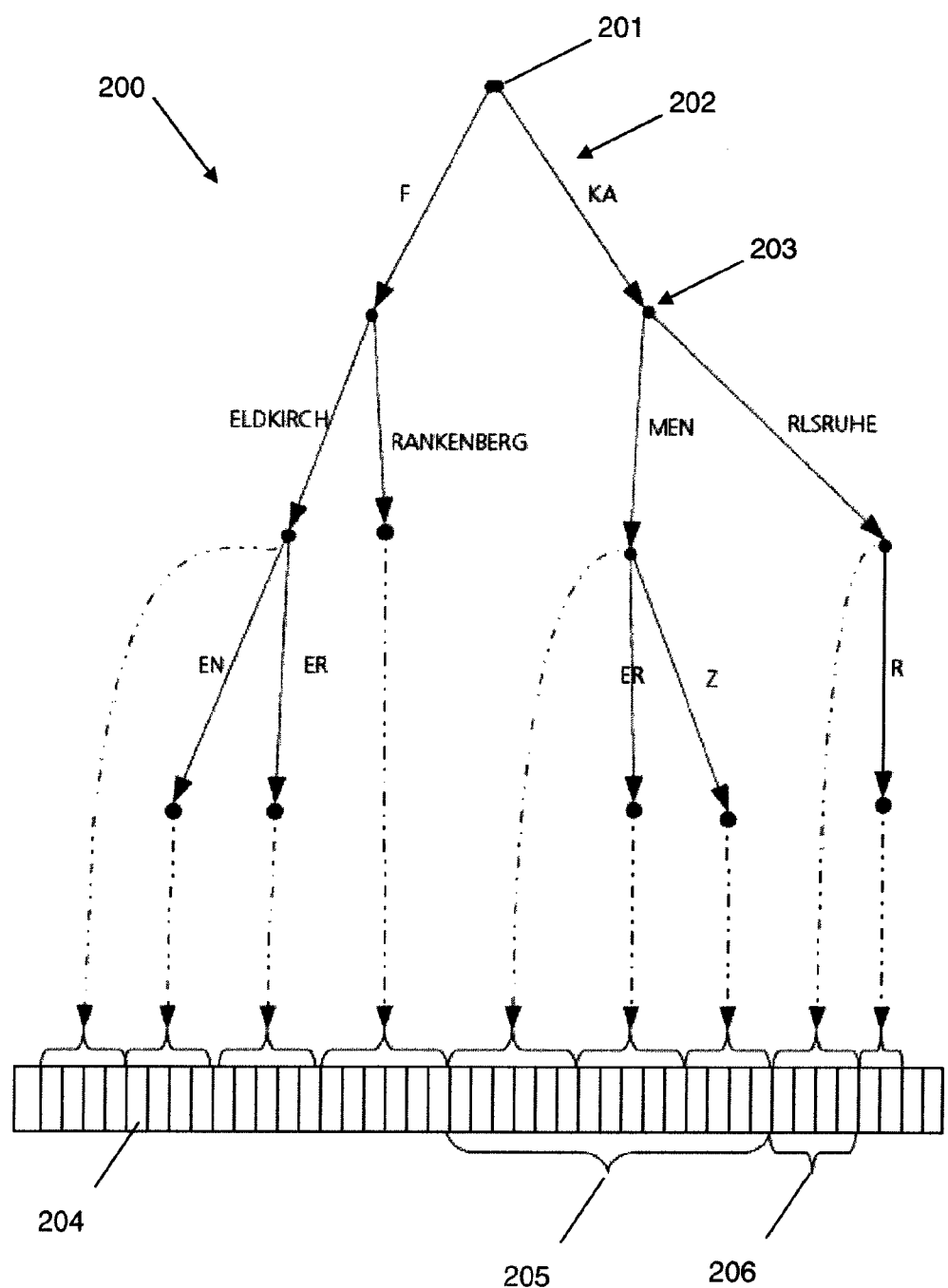
FIG. 2 shows an index data structure which forms a trie and associates object attribute values to collections of tiles defined to partition a map.

In the method, objects are found and located using an index data structure, which is implemented as a so called trie. A schematic view of such an index data structure representing a trie 200 is shown in FIG. 2. The trie 200 associates names of geographical objects to collections of map tiles in which names occur as attributes of objects. The map tiles, herein, represent spatial elements and arise from a hierarchical partitioning of a map of the navigation device by using a quadtree (quadtree partitioning). The quadtree partitioning is such that four adjoining tiles are combinable to a next-level tile, i.e. four adjoining tiles can equivalently be replaced by one next-level tile without losing any information. Herein, the area of the next-level tile covers the equivalent area as the original four adjoining tiles.

Figure 6:
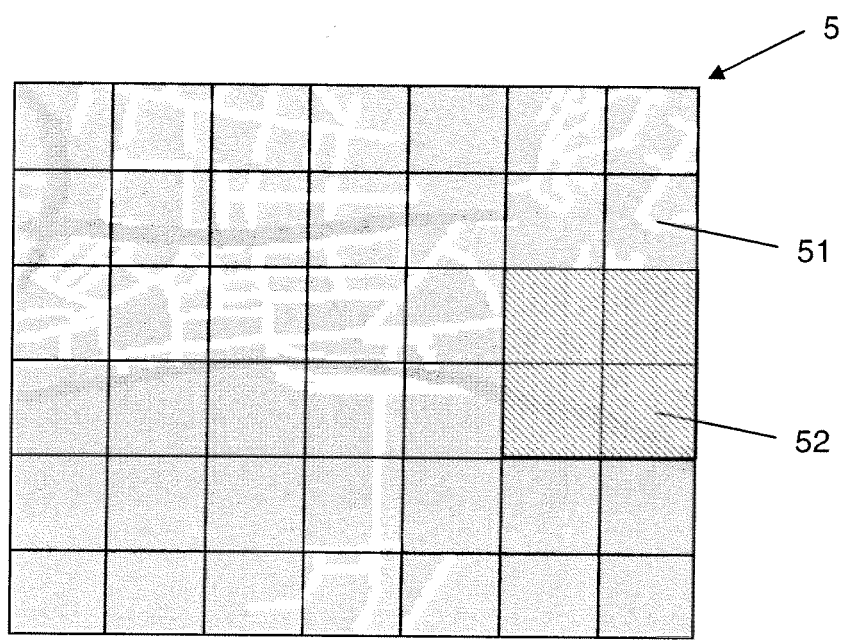
FIG. 6 shows a schematic representation of a map which is partitioned in a number of map tiles.

This is illustrated in FIG. 6. A map 5 is hierarchically partitioned in a number of map tiles 51, each representing a spatial element of the map 5. Four adjoining map tiles 51 are combinable to a next-level tile 52 which equivalently replaces the four corresponding map tiles 51 without losing any information.

To search for objects in the map data, a search query is entered into an input window 1 (FIG. 1) of the navigation device, the search query consisting of one or multiple search patterns in the form of text strings. In the case depicted in FIG. 1, "KAP" and "WAR" are entered as search patterns. The search in the database now takes place by querying the index data structure (trie 200) with each search pattern "KAP" and "WAR" separately (step 101). From each of these queries, one candidate set of tiles 102a, 102b results, wherein each candidate set 102a, 102b contains all those tiles in which an attribute of at least one object matches the respective search string "KAP" or "WAR". A match herein occurs if an attribute (e.g. its name or its region attribute) of an object matches in full or in its prefix (i.e. with its beginning characters) the respective search pattern.

To be able to implement and run the described search method on devices with limited hardware resources, such as mobile navigation devices, it is necessary to represent large sets of tiles in a memory efficient way and in a way that allows for applying computationally efficient set operations. For this, the specific structure of a quadtree is used in which four adjoining tiles can be combined to one next-level tile, thus reducing the number of tiles without losing any information.

Accordingly, if the number of tiles in an obtained candidate set 102a, 102b exceeds a predefined number, in step 102 the candidate set 102a, 102b is "compactified" by combining some or all of the tiles (map tiles 51 in FIG. 6) contained in the candidate set 102a, 102b to the associated next-level tiles (next-level tiles 52 in FIG. 6), thus reducing the number of tiles in the candidate set 102a, 102b (step 102 is also referred to as "compactification"). The combination, herein, is achieved by in each case combining four or less tiles to one next-level tile. If exactly four adjoining tiles are combined to one next-level tile, the area covered by the next-level tile is equivalent to the original tiles. If less than four tiles are combined, the area covered by the next-level tile forms a superset fully containing the area of the original tiles. In this way, the combination (compactification) is secure in that the area represented by the obtained next-level tiles is, at the most, larger than the combined area of the original tiles, such that the number of tiles associated with the candidate set 102a, 102b becomes, at the most, larger, i.e. at a later search step (step 105) more tiles must be searched exhaustively for objects contained therein. However, no information is lost by the compactification, i.e. no true candidates are left out.

The compactification in step 102 leads to a reduction of the number of tiles in the candidate sets 102a, 102b, thus reducing the memory requirements for storing the candidate sets 102a, 102b. The number of tiles in the candidate sets 102a, 102b can, in this way, be always limited to a number smaller than a predefined threshold (for example: 500).

From the thus obtained candidate sets 102a, 102b, in step 103 the intersection is formed, yielding a combined candidate set 104a that contains only those tiles that both are contained in the first candidate set 102a and the second candidate set 102b and which, consequently, contain objects whose attributes match both the first search pattern "KAP" and the second search pattern "WAR". Again, if the number of tiles in the combined candidate set 104a exceeds a predefined threshold value (which may be different than the threshold value for step 102), the tiles in the combined candidate set 104a may be compactified (step 104).

To identify all objects whose attribute values match the search query, the tiles contained in the combined candidate set 104a of tiles are searched exhaustively (step 105), i.e. the tiles one by one are looked through and all objects are extracted the attribute values of which match the search query. Such result objects are then output via an output window 2. For example, the first object displayed in the output window 2 is a street address, namely the "KAPellenweg" in "WARstein".

Other objects that may be found in this way are points of interest such as airports, tourist sites or the like. Objects referred to in this context are all those which have an identifiable location in the digital map data contained in the navigation device and which, hence, can be located in a map.

The method allows for an easy reduction of the candidate sets to be stored and processed within a navigation device. In particular, the method allows a fast and efficient multi-prefix search, i.e. a search using multiple search patterns, in particular text strings, and comparing the search patterns to the prefixes of object attributes. To find the candidate set associated with a search pattern, the unit set of all possible continuations of the search pattern must be formed. The trie structure and a specific persistent representation of the associated candidate sets reduce this process, in substance, to a sequential reading-in of elements that are incrementally added to a work set in the main memory.

This is illustrated in FIG. 2. The trie 200 depicted therein contains a root 201, edges 202 and nodes 203. Each edge 202 is associated to a non-empty string and points to a node 203 that is labeled by the concatenation of the edge labels of the path from the root 201 to the node 203. For example, the first node below and to the left of the root 201 is labeled "F", the node below and to the left that node is labeled "FELD-KIRCH" and so on.

As is illustrated in FIG. 2, within the trie 200 the tiles are stored with their tile numbers in a file 204. Nodes 203 of the trie 200 are associated with collections 205, 206 of such stored tiles. For example, collection 205 is associated with the nodes labeled "KAMEN", "KAMENER", "KAMENZ". Collection 206 is associated with the node "KARLSRUHE".

The construction of the index data structure in the shape of the trie 200 allows, on the one hand, to efficiently compute a new candidate set 102a, 102b, 104a and a corresponding list of result objects when a user alters a search query by adding a search pattern or by modifying a search pattern by adding a character to an existing search pattern. All that is necessary in this case is a single intersection operation (step 103 in FIG. 1) to form the intersection of the previously obtained combined candidate set 104a and the newly obtained candidate set. The cardinality of the obtained combined candidate set 104a in each case is reduced or, at least, does not increase.

On the other hand, the structure of the trie 200 allows estimating in a fast and efficient way the quality of an entered (or altered) search query in terms of its expressivity. In this context, the expressivity determines the capability of a search query to confine a search region. A search query has a large expressivity if the candidate set associated with it has a small (but positive) cardinality. Herein, the specific persistent structure of the trie 200 makes it possible to estimate the cardinality with good accuracy without forming the sum of the set, thus allowing to use the process also on mobile devices with limited hardware resources. In this way, an instant feedback may be given to a user about the expressivity of a search query while inputting the search query.

Figure 3A:
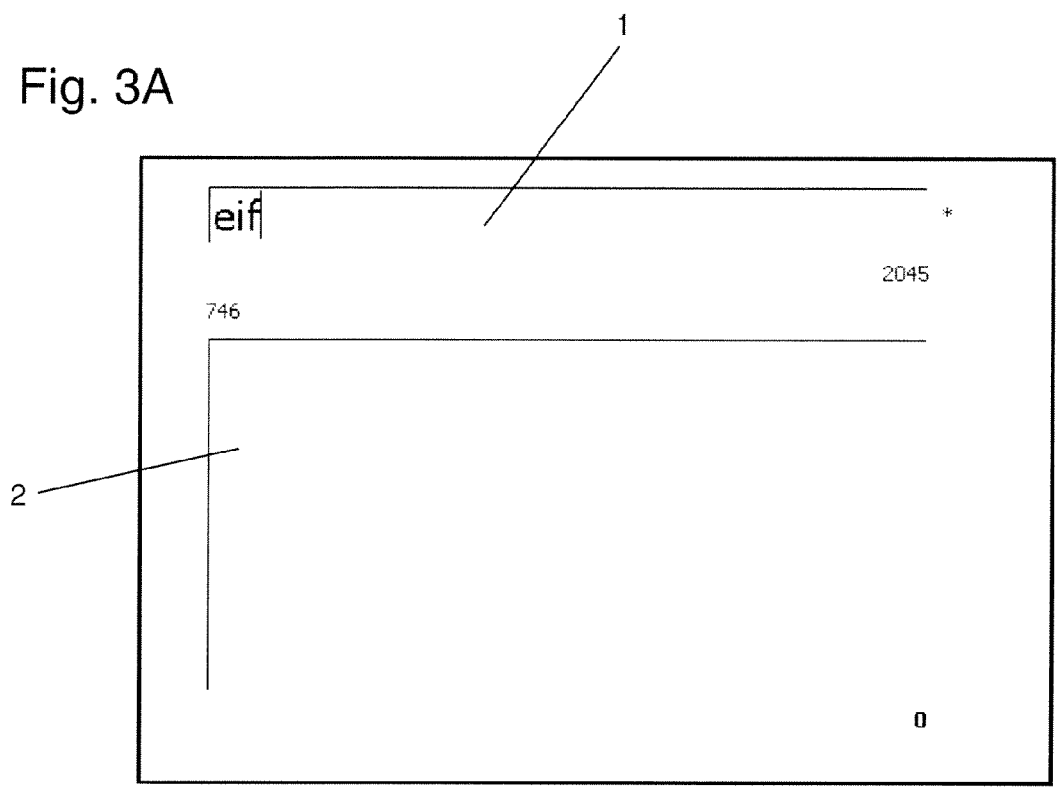
FIGS. 3a-3C show schematic drawings of an input window for inputting a search pattern and an output window for outputting a list of result objects of a navigation device.
Figure 3B:
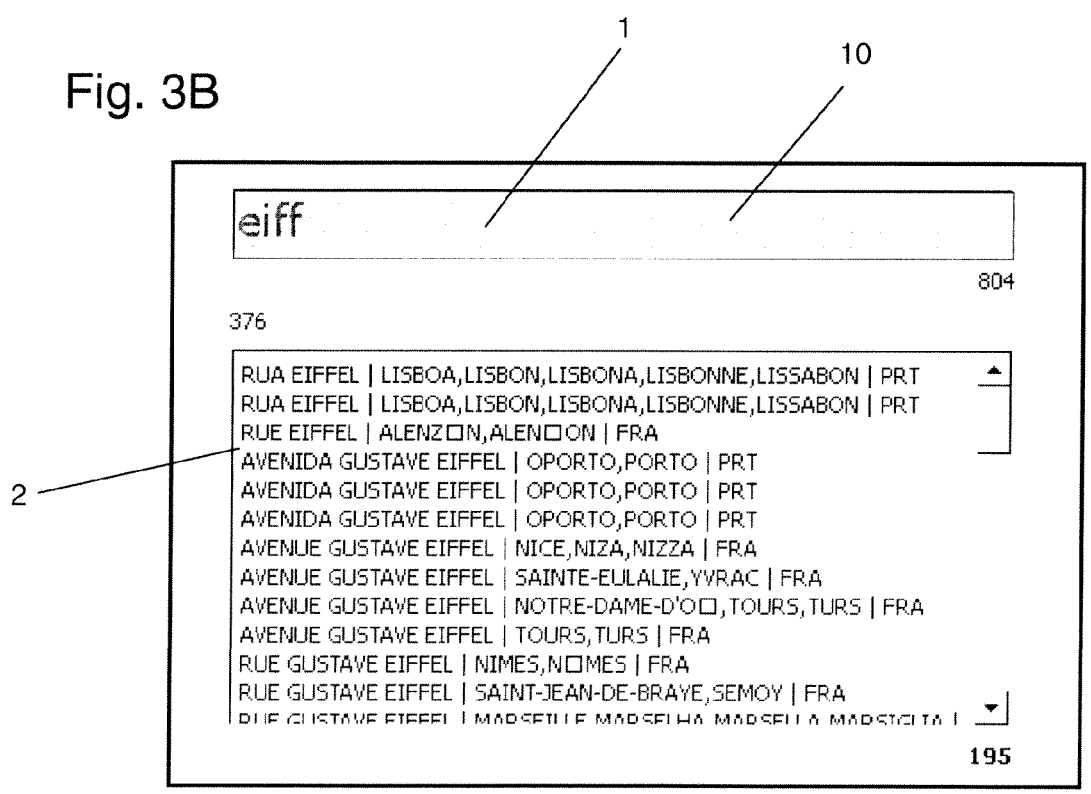
Figure 3C:
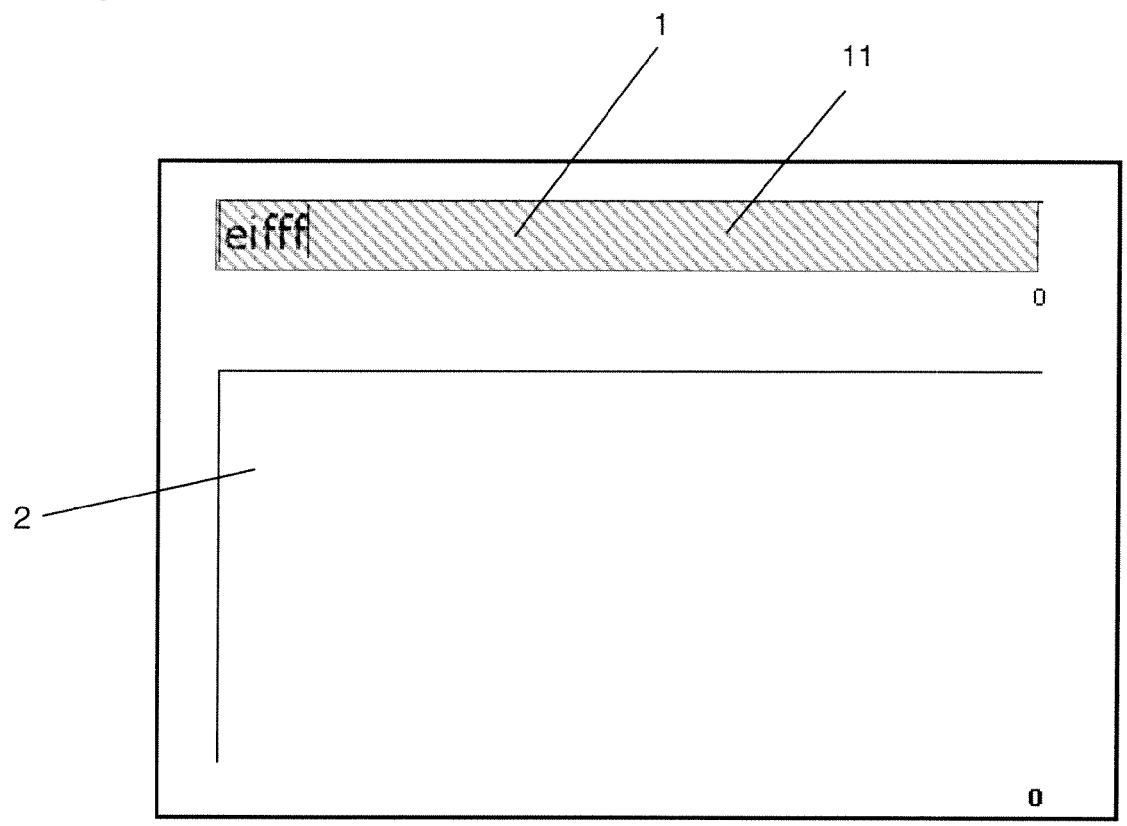

FIGS. 3A to 3C show the process during the input of a search pattern into an input window 1 of a navigation device.

At a first stage, after inputting "eif" into the input window 1, the expressivity of the entered search query is low, meaning that there are many tiles and possible result objects associated with the search query and no exhaustive search can be performed with a reasonable computational effort. Consequently, the output window 2 is empty, and the background colouring of the input window is white (or grey).

When the user inputs another letter and alters his search query to "eiff", the search query becomes more expressive, i.e. the number of tiles associated with it reduces. If the estimated cardinality becomes smaller than a first predefined threshold value indicating that a candidate set has been obtained which can be searched exhaustively with a reasonable (but large) computational effort, the colouring of the input window changes to yellow. If the estimated cardinality becomes smaller than a second, even smaller predefined threshold value indicating that an exhaustive search can be performed fast and efficiently, the colouring changes further to green (as in FIG. 3B indicated by a pointed shading 10) and the obtained candidate set is searched exhaustively for all result objects contained therein. The found result objects are then output in the output window 2, as shown in FIG. 3B.

If an input of a search query does not yield any tiles containing objects whose attributes match the search query, the cardinality of the candidate set becomes zero. This in most cases results from a typing error and can be indicated to a user by a visual, acoustical or haptical alarm. For example, when entering "eifff" as shown in FIG. 3C, an empty candidate set with a zero cardinality is obtained and instantaneously indicated by a red colouring of the input window (as illustrated in FIG. 3C by the line shading 11), possibly accompanied by a haptical alarm in the form of vibrations of the device. Since the candidate set is empty, no result objects are displayed in the output window 2.

When displaying the result objects in the output window 2, the order of the objects is chosen according to their probable relevance to a user. For this, heuristic rules may be employed which use information obtained from the search query input by a user or from general relevance information stored in connection with geographical objects (for example, large cities may be considered more relevant than small cities and so on).

Figure 4A:
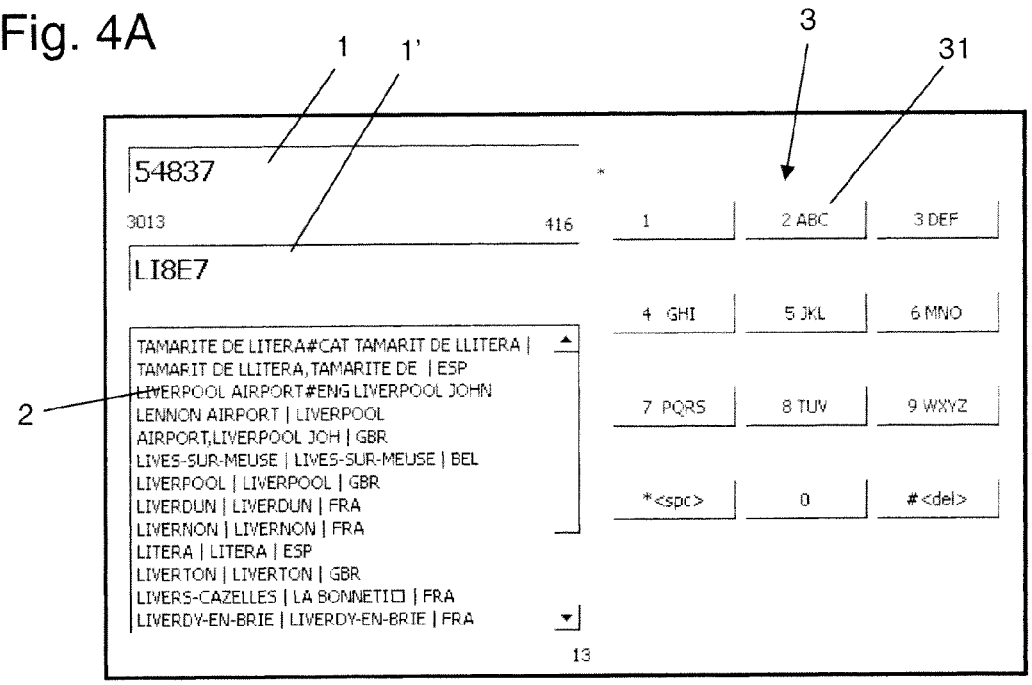
FIGS. 4A-4C show schematic drawings of an input window for inputting a search pattern, an output window for outputting a list of result objects and a keypad of a navigation device for inputting the search pattern.
Figure 4B:
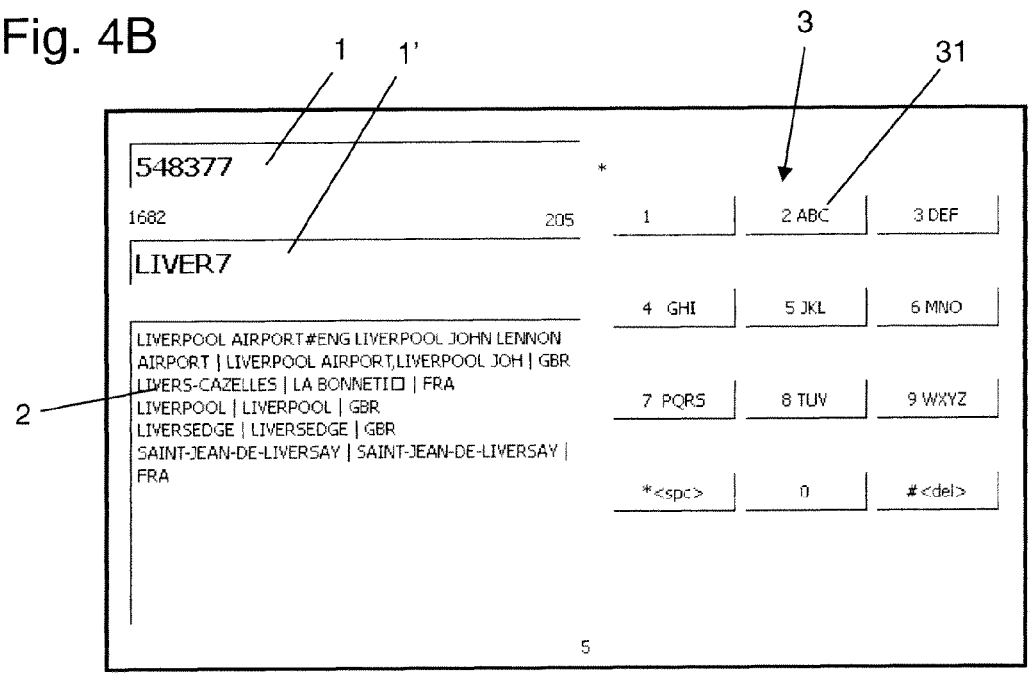
Figure 4C:
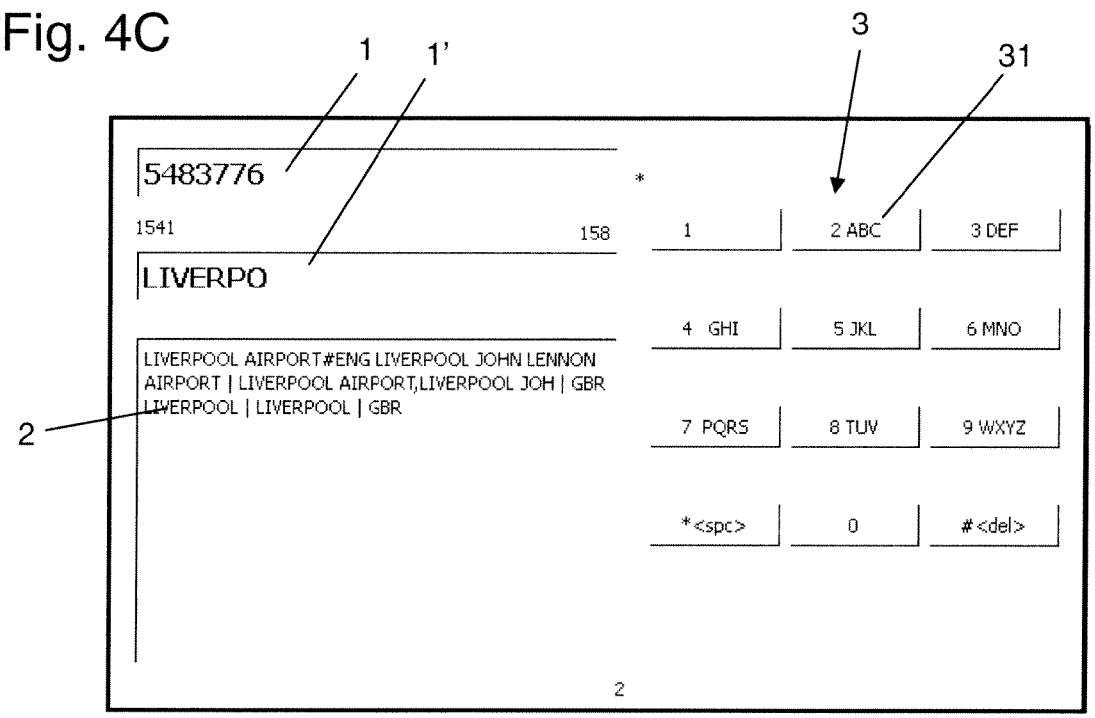
Figure 5A:
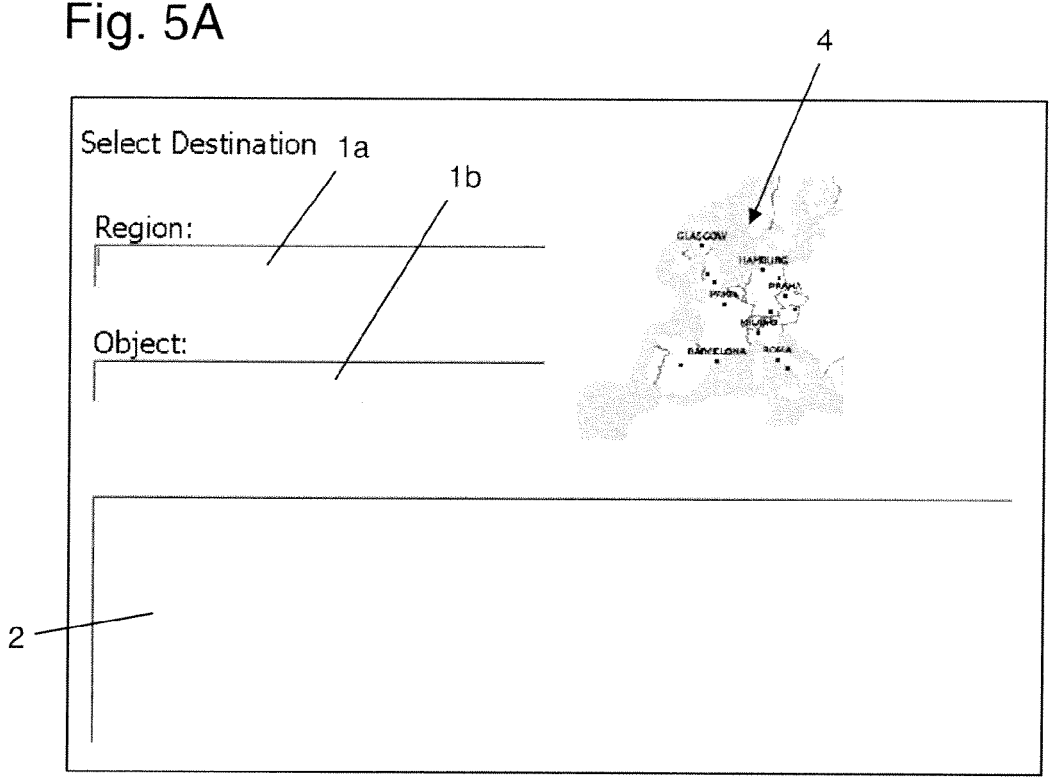
FIGS. 5A-5G show schematic drawings of a first and second input window for inputting a search pattern, an output window for outputting a list of result objects and a geographical map segment being displayed and continuously adjusted in dependence of an input search pattern.
Figure 5B:
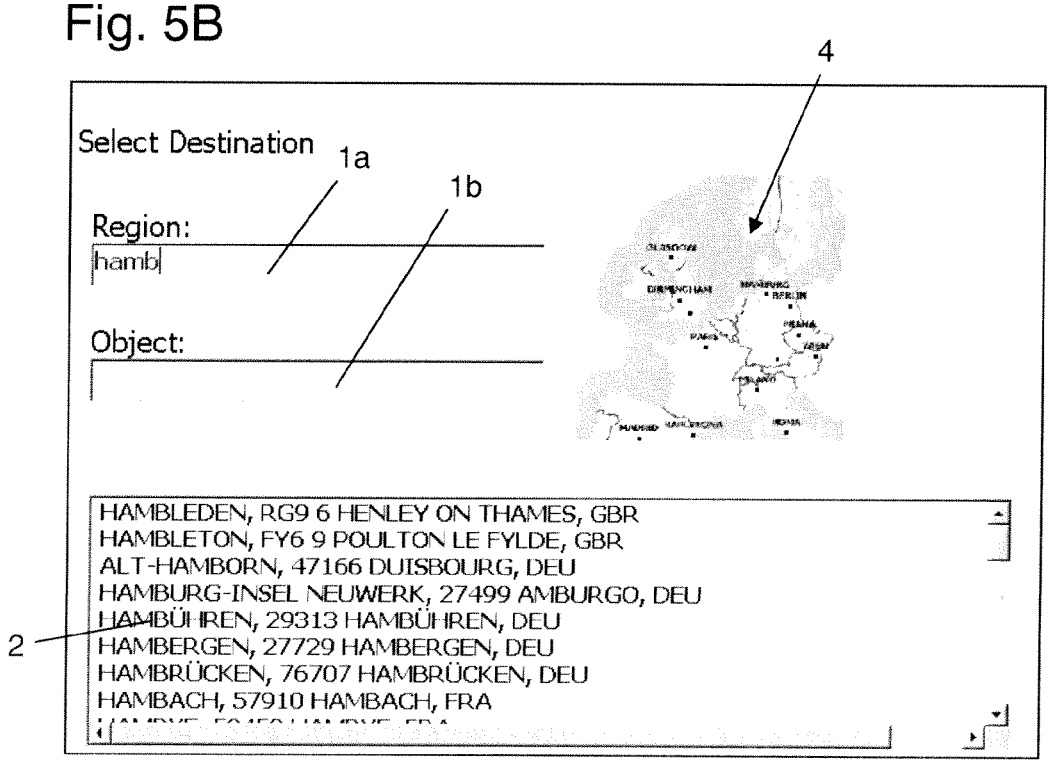
Figure 5C:
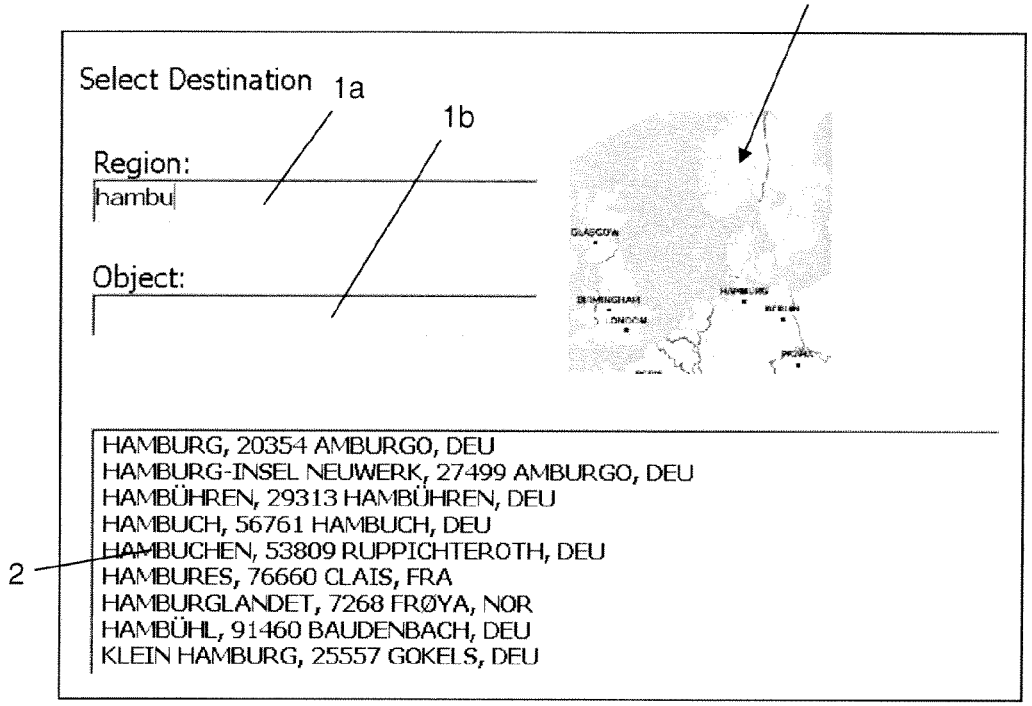
Figure 5D:
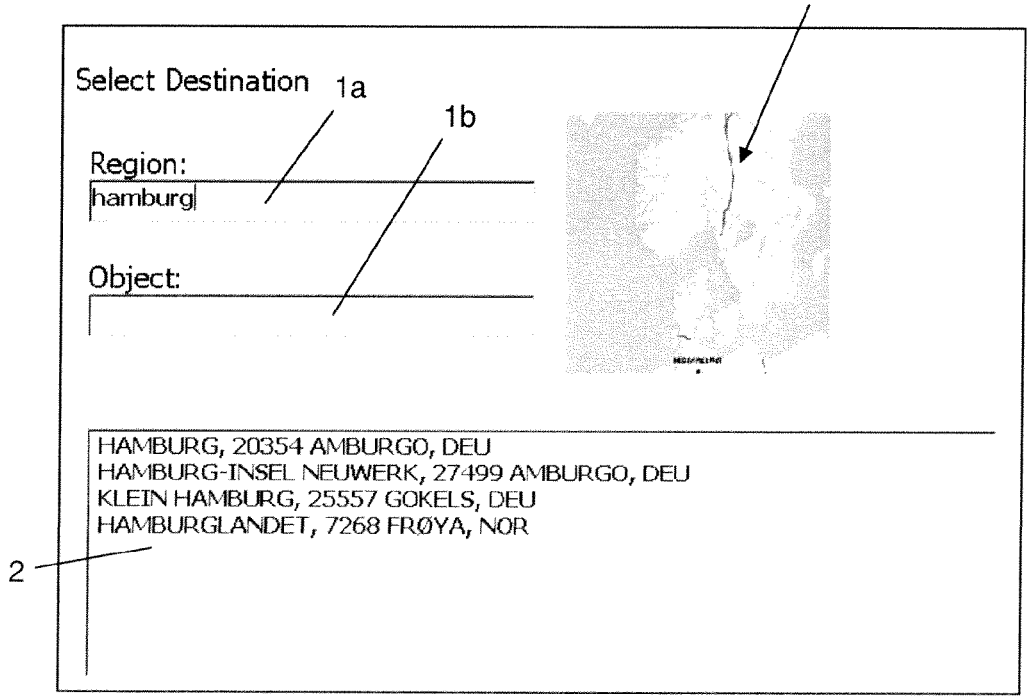
Figure 5E:
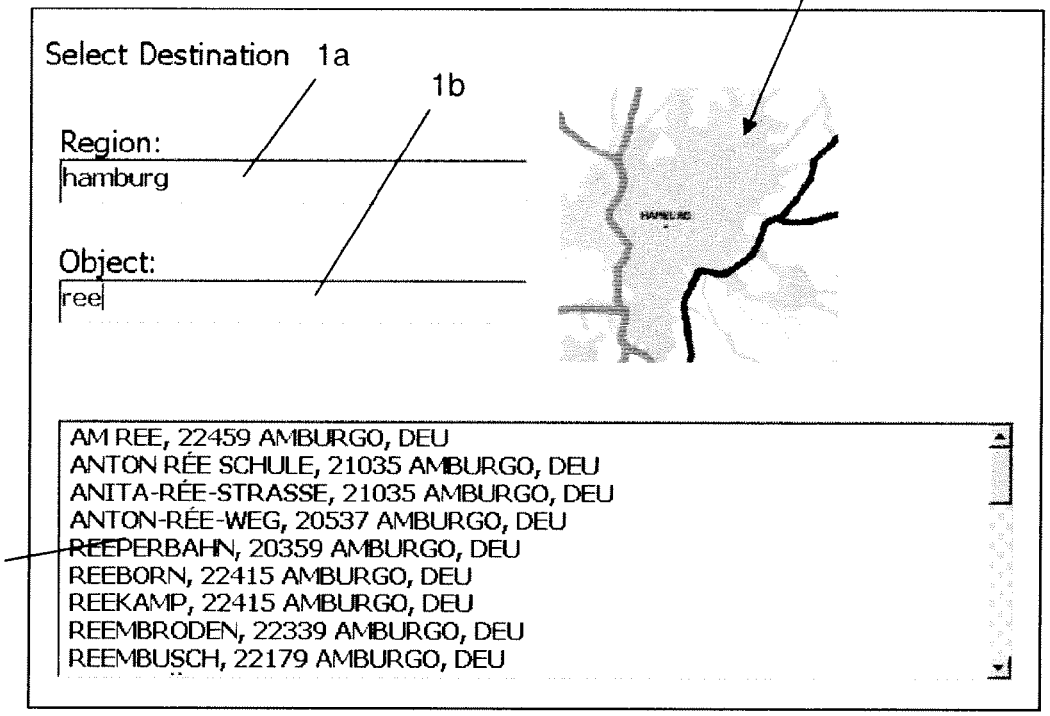
Figure 5F:
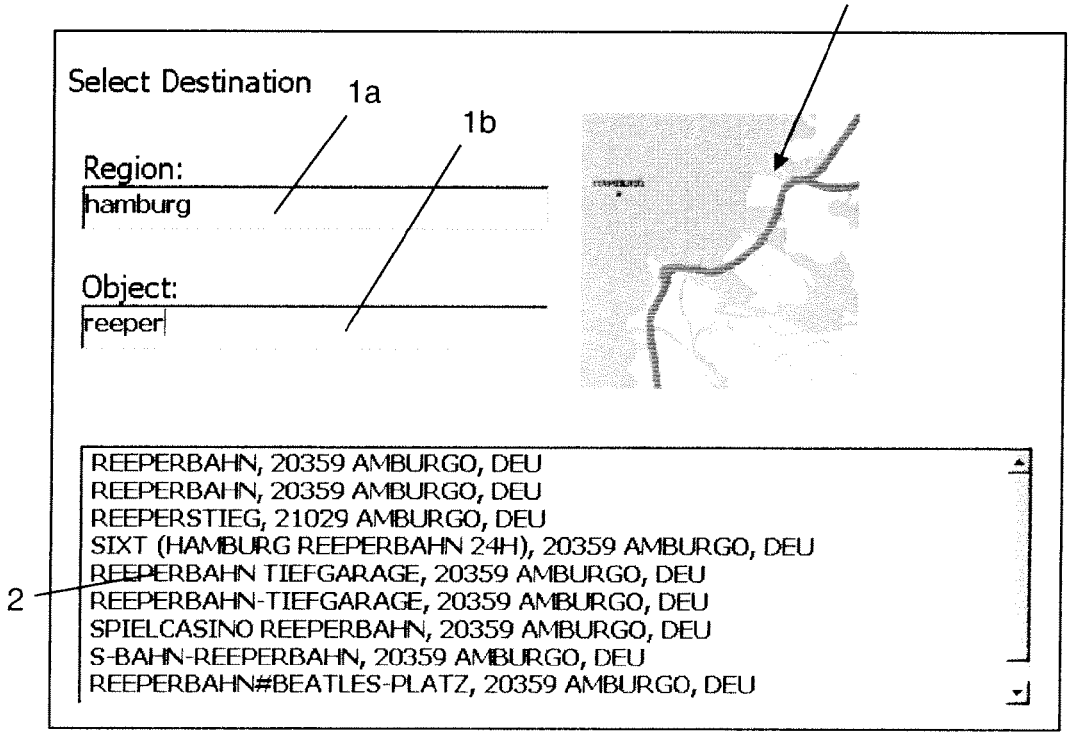
Figure 5G:
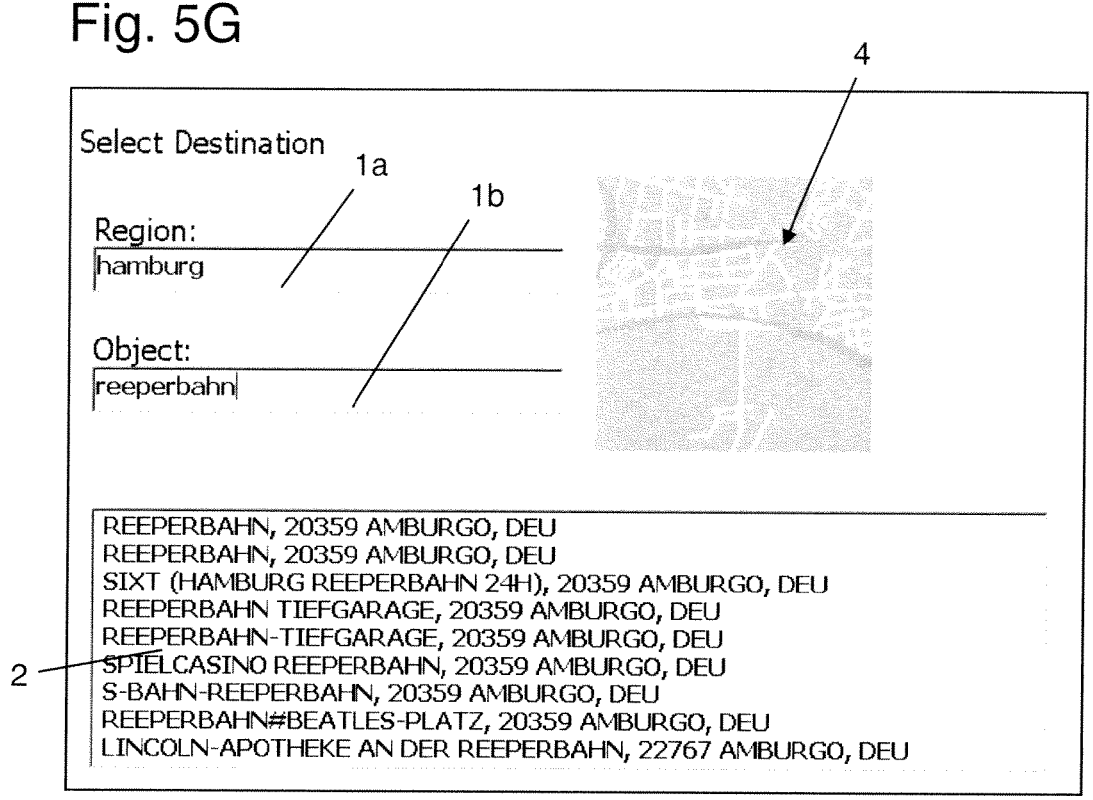

The input of a search query (consisting of one or multiple search patterns) may also, as shown in FIGS. 4A to 4C, be done via a numeric keypad 3, for example of a mobile phone on which a navigation application is implemented and which thus functions as a navigation device. The keypad has, as is commonly known, twelve keys "0" to "9", "*", "#". The key "*" is used to insert a space in the input window 1, the key "#" is used to delete a digit or space at the right end of the input window 1 (i.e. the one that was entered most recently). To some of the keys in addition alphabetic characters are assigned. For example, key "2" (reference numeral 31) is marked also with "ABC" indicating that letters "A", "B", "C" are additionally assigned to this key.

When inputting a search query, it is not necessary to press a key more than once. For example, for the letter "C", key "2" has to be pressed only once. Hence, a user can input a search query in a fast and easy way as if using a full keyboard and without having to use complicated sequences of keystrokes. In the example of FIGS. 4A to 4C, a user inputs digits "5483776" by pressing the respective keys of the keypad 3 one after the other. With the input of each additional digit the search query becomes more expressive and the output list of result objects displayed in the output window 2 becomes shorter (in FIG. 4C it contains only three objects).

As is illustrated in FIGS. 4A to 4C, the display (which may be the regular display of a mobile phone) can contain an additional window 1' translating the input search query from digits into possible alphabetic or alphanumeric text strings (for example, digits "548377" possibly corresponds to"L-IVER7", the "7" herein indicating that the continuation is still ambiguous). As the user types in more digits and as the size of the candidate set and the number of matching result objects (shown in the output window 2) decreases, more and more of the digits entered in the input window 1 will start to correspond to one and the same letter in all matching search results. This correspondence is separately shown in the window 1' below the input window 1, but could also—for better readability—be visualized directly in the input window 1.

In another embodiment, as illustrated in FIGS. 5A to 5G, a geographical area may be displayed visualizing an area corresponding to an input search query. In the example of FIGS. 5A to 5G, two input windows 1a, 1b exist and are displayed, the one input window 1a allowing a user to enter a search pattern for a region and the other input window 1b for entering a search pattern for an object. While entering a search pattern in the region input window (FIGS. 5B to 5D), the obtained candidate set assumes a smaller and smaller cardinality and contains less and less tiles. Accordingly, the number of result objects obtained from exhaustively searching the tiles becomes smaller, until in FIG. 5D only four matches for the region input search pattern are displayed in the output window 2. When now entering a search pattern in the object input window 1b (FIGS. 5E to 5G), the found result objects matching both input search patterns are displayed in the output window 2, the search query becoming more and more expressive with entering more letters in the respective input windows 1a, 1b.

While entering the search patterns into the input windows 1a, 1b, a map segment 4 showing a geographical area corresponding to the tiles of the obtained candidate set is displayed next to the input windows 1a, 1b. The geographical area may for example be obtained by taking the northernmost, southernmost, easternmost and westernmost tile and spanning a rectangular geographical area between them. When the search query becomes more and more expressive, the corresponding geographical area becomes more confined, such that the scale of the displayed map segment 4 becomes larger and larger, causing a zoom-like impression of a closing-in into the region of interest.

The sequence of FIGS. 5A to 5G illustrates a situation in which a user enters the characters of the search query "HAMBURG REEPERBAHN" one by one. In parallel, the scale of the map segment 4 is zoomed stepwise starting from a map segment 4 showing whole Europe and arriving at a close-up of the part of the city of Hamburg in which the street named "Reeperbahn" is located.

To improve the speed of displaying the map segment 4, less important details of the map (such as forest regions) may be left out.

Advantageously, the display of the map segment 4 is updated in each case before the exhaustive search within the candidate set of tiles is performed, because the exhaustive search may computationally be expensive.

A flow diagram of another embodiment of a method for searching objects in a database constituting a refinement of the general method described above is shown in FIG. 7. This refinement makes use of a multi-phase heuristic search approach in order to further improve the efficiency of the method in terms of computational speed and user friendliness, and shall be explained in detail in the following.

The purpose of this refinement—as well as of the embodiments having been described above—is to support targeted retrieval of a specific object or a small set of objects from a large tile-structured map database. Herein, the user input has the form of unstructured multi-prefix search queries, and the interaction should be incremental and responsive. This functionality must specifically be supplied in an environment with limited resources and without any network connectivity.

The term "targeted retrieval" herein refers to the fact that the user has a specific object from the map database (such as a city, street, or point of interest) or small set of objects in mind when beginning the interaction with the search engine. This object may also be referred to as "the user's target object".

As described above, the method uses a database in which a space is partitioned into spatial elements, e.g. a map is partitioned into tiles of a quadtree (see FIG. 6). Since it may be impractical in a limited-resource environment to exhaustively search the entire database if the database is large (as it is usually the case for map databases), the refined method uses a resource-constrained heuristic search approach whose search strategy—coarsely—can be described as follows.

In a first phase (referred to as phase 1 in FIG. 7), the search space in which an (exhaustive) search is to be performed is reduced using a special heuristic approach. Within this heuristic approach certain heuristic candidate sets are selected as sub-sets of the search space which have a high probability of containing the user's desired result. These (relatively small) heuristic candidate sets are exhaustively searched in order of ascending size (smallest candidate region first).

In a last phase (there may be more phases between the first and the last phase, as will be described in the following in detail), then, the entire space is considered and a general candidate set is determined in a way that it must definitely contain the desired result, i.e. without using any role-specific constraints. This candidate set, also referred to as catch-all candidate set, is also exhaustively searched (omitting tiles which were already exhaustively searched due to their membership in one of the role-specific heuristic candidate sets).

To meet resource and response time constraints, the search process is aborted if a resource limit is hit during an exhaustive search phase, and the application is notified of that condition. It can then e.g. encourage the user to extend the query to make it more expressive (for example using a coloring scheme as described above with reference to FIG. 3), so the desired result will hopefully be found in the next interaction cycle—if it was not already found in this round. The overall resource limit (expressed as a maximum number of map features to be considered in exhaustive searching) is partitioned into individual quotas assigned to the various phases of the search process, in order to give each of them a fair chance (this partitioning is based on dedicated heuristics.)

The refined method shall now be explained in detail with reference to FIG. 7.

Figure 7:
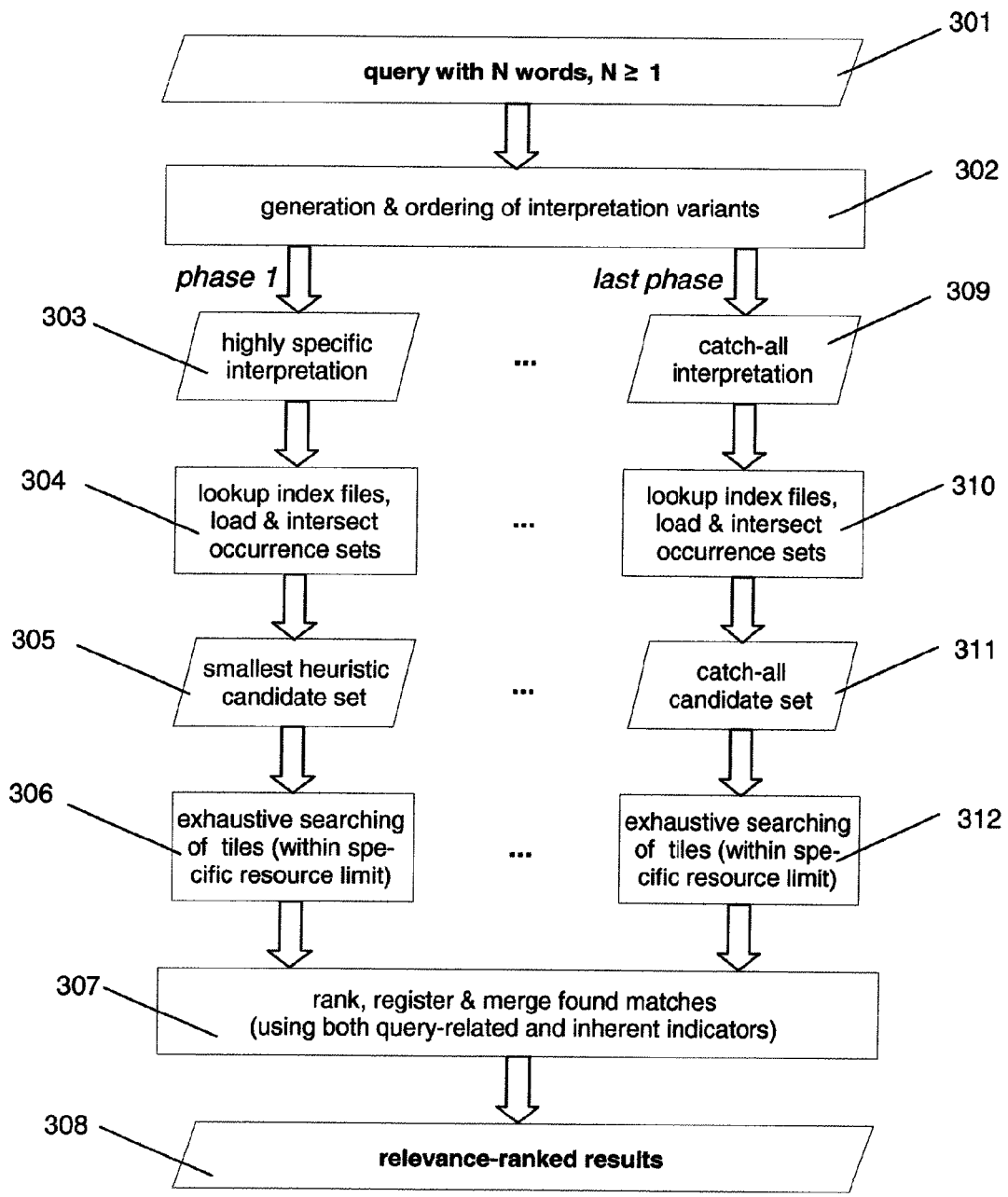
FIG. 7 shows a flow diagram of a refined method using a heuristic search approach.

As illustrated in FIG. 7, a user may input a search query comprising N search words (search patterns) into an input window (field) of a device running the method (step 301). In step 302, then, already during or right after completion of the input different interpretation variants of this entered search query are generated and ordered for the further search process. These interpretation variants (also simply referred to as "interpretations") are used for computing so called role-specific heuristic candidate sets to provide a reduced search space.

The starting point for the computation of role-specific heuristic candidate sets is the following observation: When the user enters a certain search query with the intent of targeted retrieval of a specific target object, this means that in his or her opinion, it should in principle be possible to uniquely identify the target object based only on this search query—and this will often (albeit not always) be actually the case.

Now even though the user normally will not explicitly think about this in detail, he or she would, when asked, usually be able to explain how this search query can be understood in a way that clearly identifies the target object. So the method system "just" needs to be able to "guess" this interpretation.

It hence has been investigated which aspects of multi-prefix text queries pertaining to map search make it possible to identify target objects even using very short queries, if only the right interpretation is used—and how such "right interpretations" can be characterized. For this, the individual input search patterns of a search query can be regarded to assume certain roles. These roles are relevant in a description of how a search query "is meant" or "should be interpreted". The roles furthermore may allow considerable reductions of the search space by yielding a role-specific heuristic candidate set for a search pattern. This role-specific heuristic candidate set may be much smaller than the candidate set of the same search pattern without the role constraint.

This reduction is even more effective on the level of combined candidate sets which are computed as the intersection of the role-specific heuristic candidate sets of the individual search pattern: if each (or at least most) of the operands get much smaller thanks to the role constraint, the reduction effect is multiplied in the intersection. This set size reduction may cause a combined heuristic candidate set to be empty with an increased likelihood compared to the unconstrained case using candidate sets without the role constraint.

The various search query interpretation variants are obtained by making assumptions of the role of each search pattern in the search query, such as "the search pattern occurs in a region name" or "the search pattern is the first word of an object name". Obviously, the more search patterns are comprised in a search query, the more possible combinations of such assumptions exist.

For example, an input search query "BER HUS" may be interpreted in a first interpretation to comprise two input search patterns "BER" and "HUS" of which the first refers to a region and the second to an object's name. Another meaningful interpretation may be that the input search patterns occur in an object's name just in that order. Multiple other interpretations exist and may be considered.

Before the main search process begins, in step 302 combinatorially all meaningful, nonempty search query interpretations are enumerated and ordered in a way such that the most specific interpretations (for which most of the role-specific heuristic candidate sets will be very small) come first.

These interpretations will later be used to guide the heuristic search process which is employed since it is normally not possible to exhaustively search the entire database. Each interpretation yields a heuristic candidate set defined as the intersection of the role-specific heuristic candidate sets which can be efficiently computed, in this way providing access to a small part of the search space which must contain the target object if this interpretation variant correctly reflects the intention of the user. This small part is later subject to the exhaustive search in order to actually identify matching database objects.

The following search pattern roles may for example be used to generate the search query interpretations in step 302:
A. Attribute Categories. Database attributes are often characterized as belonging to a certain category—e.g. in a map database, an object will have one name attribute and several region-related attributes (storing the city name, region names, and country name the object is situated in). Thus a search space reduction can be achieved by regarding each search pattern as referring to a certain attribute category. An interpretation is then characterized (amongst other) by an assignment of a category to each of user-supplied search patterns, e.g. "the first word is interpreted as referring to a name attribute, and the second word is interpreted as referring to a region attribute" Among the large number of combinations of category assignments which are combinatorially possible that way, the method may select a subset of combinations for further processing which are highly likely to occur in practical queries. Finally, an interpretation variant is considered where the search patterns are not constrained to refer to particular categories.
B. Matching with/without word-ordering constraint. The following two interpretation variants are considered: in the first, more specific interpretation, the first search pattern must match the first word of the name of an object to be matched, and the remaining search patterns must match other words within the object name (which are not in the first position). In other words, the first search pattern of the search query is considered to be in the "first-word role", the other query words are considered to be in the "non-first word role." In the second, more general interpretation, each search word may match any word of the object name, regardless of their positions.
C. Matching with/without word number constraint. The following two interpretation variants are considered: In the first, more specific interpretation, the object name must have a number of words which is derived form the search query. In other words, each of the search patterns is assigned a "k-word role" where k is a number derived form the search query. In the second, more general interpretation, the number of search patterns is not understood to imply a specific number of words in the object name to be found.
D. Exact/Prefix Matching. Each search pattern can be interpreted as a prefix (the search pattern matches object attributes starting with the particular search pattern), or as an exact template (matching only the exact same search pattern in an object attribute). Since this role could be assigned to all search patterns independently (and independent from the other roles) and since a combinatorial explosion of interpretations should be avoided, the method may choose to consider only a selected subset of these variants.

The interpretation variants may be first enumerated in the form of abstract, symbolic descriptors before corresponding role-specific heuristic candidate sets are actually generated and, later on, exhaustively scanned.

The size of the heuristics sets to be generated from the different query interpretations is strongly correlated to the extent in which more general or more specific roles are used in the interpretation. In order to have the smaller candidate sets be computed and scanned before the larger ones, the descriptors are assessed taking the assigned roles into account. They are then re-ordered in ascending order of the (expected) size of the corresponding heuristic candidate sets.

After completion of step 302 in FIG. 7, the different interpretation variants for the entered search query are at hand and are processed further in the following steps to compute a heuristic candidate set for a specific interpretation.

In step 303 first the interpretation that is expected to be most specific according to the above-noted ordering is taken. In step 304 for this interpretation through a look-up in the (main) index data structure or an auxiliary index data structure (referring to for example only the region attribute of an object) then for each search pattern (to which a particular role is assigned within the considered interpretation) a role-specific heuristic candidate set is determined, and by intersecting the role-specific heuristic candidate sets of the different search patterns the combined heuristic candidate set is obtained (step 305). For the most specific interpretation this heuristic candidate set is probably small (if not the smallest of all since the interpretation is expected to be the most specific), such that the tiles of this heuristic candidate set can be exhaustively searched (step 306), at least until a resource limit is hit. The results are then ranked and displayed in a suitable display window (steps 307, 308).

This is repeated for all interpretations to be considered, and in the last phase (right in FIG. 7) the so called catch-all interpretation is assumed in which the search query is not constrained by assuming that particular search patterns have particular roles (step 309). I.e. in the last phase the entire search space is considered in that the (unconstrained) candidate sets are obtained for each input search pattern through a look-up in the overall (main) index data structure (trie, see FIG. 2) and the combined candidate set is derived by intersecting the candidate sets (steps 310, 311). This combined candidate set is also exhaustively searched until a resource limit is hit (step 312), the results are ranked and merged with the previously obtained results (step 307) and displayed (step 308).

Some of such steps shall be explained subsequently in more detail.

Heuristic Candidate Stet Computation (Step 304, 305)

In the instant method, all candidate regions are represented in the form of (sometimes compactified) tile sets. The design of the data structure allows very efficient membership test, inclusion, union and intersection operations while taking a modest and constant amount of memory.

Persistent indexes referencing into persistent pre-computed role-specific heuristic candidate sets is used to compute the above-described series of candidate sets from different interpretations of the search query.

In this regard, different "roles" of an input search pattern may be treated differently to determine the corresponding heuristic candidate set.

For example, for computing a role-specific candidate set when a search pattern is assigned the "region category role", auxiliary index data structures may be used which, for example, associate search words to sets of tiles in which objects occur having a region attribute matching the search word. This auxiliary index data structure is also referred to as "region index" and is pre-computed prior to execution of the actual search method, like the other index data structures. The region index can be similar in shape and construction to the one shown in FIG. 2, but associates only the object's region attribute to corresponding collections of tiles (an object in general is described by several attributes, for example its name and its region).

Since the region index only associates region attributes to collections (sets) of tiles, the region index as well as the resulting candidate sets are smaller in size than the (main) index data structure and the candidate sets resulting from stepping through the (main) index data structure.

If an input search pattern is interpreted as referring to a region name (the region being an attribute of an object), the region index is used and stepped through in order to read-out the corresponding role-specific heuristic candidate set. For example, if an input search pattern "BER" is interpreted as referring to a region attribute, by means of the region index it is determined which collection of tiles corresponds to this particular search pattern, thus determining the desired role-specific heuristic candidate set. Since the region attribute is only one object attribute, the obtained role-specific candidate set is smaller compared to the candidate set that would have been obtained by matching the input search pattern to any object attribute using the (main) index data structure.

Instead of employing auxiliary index data structures, or in addition to using such auxiliary index data structures, it also is possible to extend the (main) index data structure to determine role-specific heuristic candidate sets. For the purposes of this extension, dedicated additional branches may be added to the tree-shaped index data structure. That way, for example, it may be pre-stored additionally in the (main) index data structure which collection of tiles corresponds to object names having the considered input search pattern as the first word. For example, if the input search pattern "BER" is interpreted as being the first word in an object's name ("first-word role"), only such tiles are associated with this input search pattern that comprise objects having "BER" as first word in their name.

For low-expressiveness search patterns, the candidate sets (especially in the role-unconstrained case) are large and take a long time to compute, for two reasons: a large number of tile numbers must be read from the persistent tile sets, and during their following in-memory aggregation into an approximate tile set data structure, compactification must be carried out frequently.

However, there only exist a rather small number of prefixes (several thousands in the Western Europe map database example) in the index which are so inexpressive that this problem arises.

Therefore, a separate, dedicated persistent "bulk" index and set combination may be employed, which provides pre-compactified, efficiently loadable sets for these problem cases. Set lookup first tries to find an entry in the bulk index, only if this fails, the normal index and associated persistent tile sets are used.

The actual computation of each role-specific heuristic candidate set is based on the symbolic representation of the interpretation variant it corresponds to. Depending on the variant, the different (main and auxiliary) indexes are accessed to retrieve specific component sets from the persistent set representations. Persistent set representations are then loaded into memory and combined (intersected) to obtain the actual heuristic candidate sets.

In practical search sessions, a large share of the candidate sets required for the computation of the combined candidate sets is needed more than once. A caching mechanism for computed candidate sets therefore makes sure that the effort for re-computing these sets is saved most of the time.

Exhaustive Search and String Matching (Step 306)

As soon as a candidate set has been computed (and is non-empty), it is exhaustively searched (i.e. in step 306 for a particular interpretation and in step 312 for the unconstrained case). String matching can take place either in the normal "exact mode", where each search pattern must match some database object attribute character-by character, or in an "approximate mode" where a match is registered even if certain "allowed deviations" between search patterns and object attribute exist. Some examples for such allowed deviations are (without limitation of generality):

using the "base character" (e.g. 'o') of a diacritical character in the search pattern, even though the object attribute contains the original diacritical character (e.g. 'ö'), using a transliteration (e.g. 'ss') of a special character in the search pattern, even though the database attribute contains the original special character (e.g. 'ß'), using a mistyped, but recognizable variant of the original search pattern (e.g. EIFEL TOWER) instead of the actual database attribute (EIFFEL TOWER).

The entire exhaustive search process stops as soon as either resource-oriented limits are reached or enough matches have been found, i.e. an application-specific limit for the number of matches is reached.

In order to support such inexact matching already during computation of candidate sets (or also role-specific heuristic candidate sets), the method may use "enriched" pre-computed index data structures which not only contain the original words as occurring in attributes of database objects but also contain variations of these words as described above. The method also may use techniques to retrieve, when presented with a misspelled but recognizable search pattern, the original word as occurring in a database object attribute from the index data structure by first identifying one or more similar words which do exist in the index, and then retrieving the correct associated collection of tiles. The method may also use a combination of these two approaches.

Result Ranking (Step 307)

A user not only wants to see the target object in the result list at all, but expects to see it close to the top of the result list. In order to achieve that, the relevance of each result is evaluated using a variety of indicators (sometimes called signals in the literature). Each indicator is a numeric value expressing if or to which extent some property of the evaluated result database object might make this object relevant to the user. These properties and their associated indicators can be classified into categories as follows:

Semantic database-inherent properties: Certain database objects have a higher probability of being relevant to the average user than others. Indicators of this class evaluate only the database object itself using semantic knowledge about the database content. For instance, large cities or streets might be ranked more important than smaller ones.

Query-matching properties: Indicators of this category operate on the lexical and syntactical level, without using semantic knowledge. Instead, they evaluate details of how the query matches the database object. For example, an exact match might be ranked more important than an inexact match.

The final ranking is a weighted combination of all the indicators. The method may either directly use the ordering implied by this ranking or apply additional re-ordering techniques (e.g. clustering results according to certain common traits) before presenting the result list to the user.

Subsequently, some further concepts are described which may be used in further refinements of the method.

Further Concepts

Search across a multitude of databases:

Often not all the data the user wants to search can be held in one and the same database. In that case, the search process is extended by using several separate search processes but integrating the results in a single result store using one and the same ranking scheme. The individual search processes can either be of the kind described previously or may be entirely different, external search processes, the results of which are adapted so they can be processed by the common ranking phase.

Figure 8:
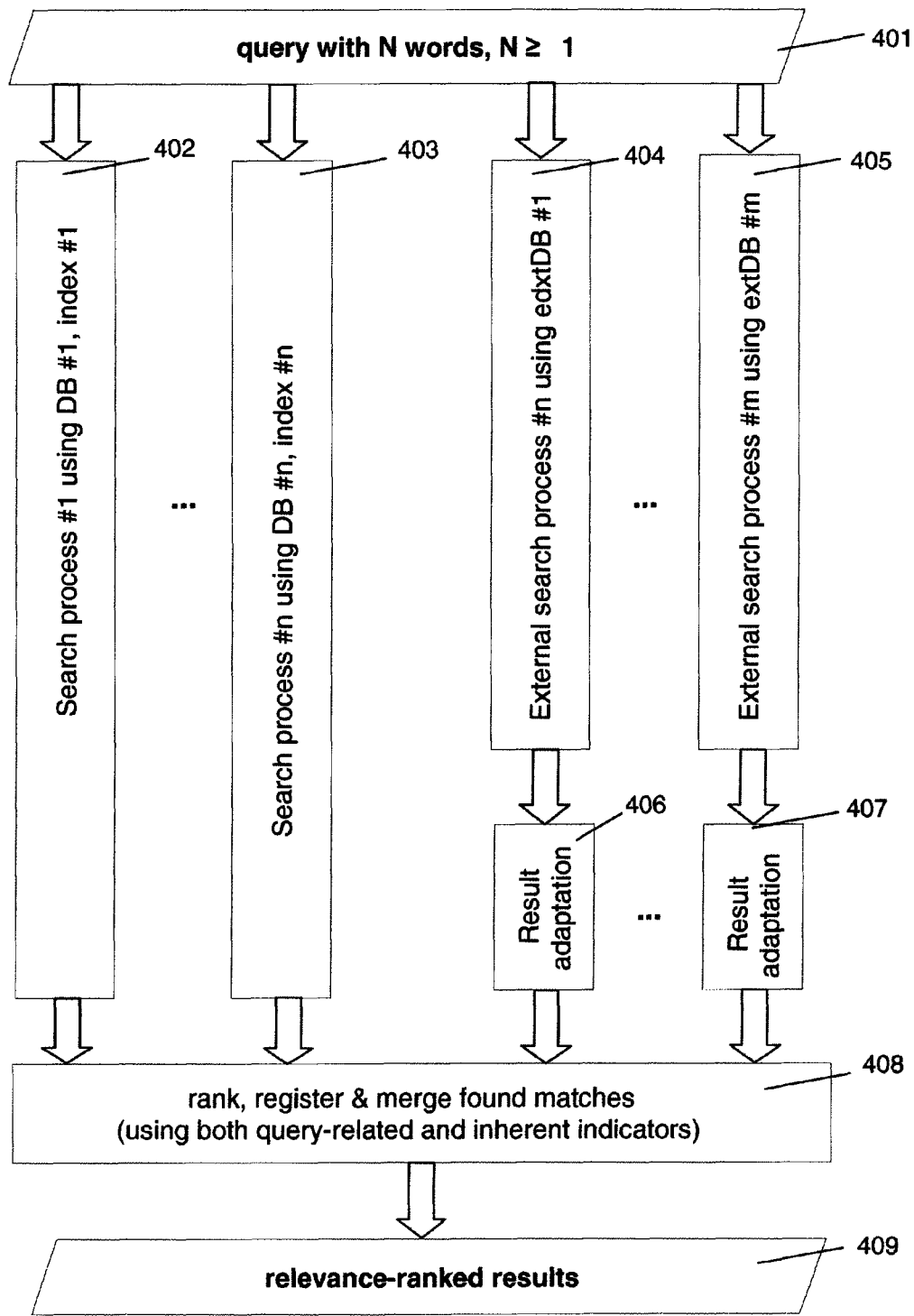
FIG. 8 shows a flow diagram of a search method across multiple databases.

This is visualized in FIG. 8. Herein, the graphical depiction is not meant to imply a specific ordering of the individual search processes indicated by the vertical boxes.

In the example of FIG. 8, a search query comprising N input search patterns is entered (step 401). In steps 402 to 405 on the basis of the entered search query searches are performed in different databases. Step 402 may for example correspond to a search in a database using a search method of the type described above. Step 403 may correspond to a search in a different database but using a similar search method. Steps 404 and 405 may correspond to searches in again different databases using entirely different search methods.

In steps 406 and 407 the results of the external search processes are adapted to be compatible (e.g. in their format) to the results of steps 402 and 403, so that the results can in step 408 be ranked, registered and merged and in step 409 displayed together.

The search processes (steps 402 to 405) can be executed either in parallel or in a sequence, the order of which can be adapted to the application.

Query-expressiveness guided selection of source databases:

Early during user input the (partial, incomplete) search query, due to its low expressiveness, is not sufficient for any meaningful search space reduction in a large database. It would be possible to enumerate actual matches in this situation but they will appear rather chaotic and useless to the user.

As the expressiveness of a query is relative to the size of the database it is applied to, this can be alleviated by considering only a smaller, selected part of the database (a segment of the database) in this situation, or, in case of multi-database search, only a subset of the source databases available.

Except for some default database sources (or segments), each available source database (or database segment) is only included in the search process if the expressiveness of the query (considered either in relation to this database, or to some source database selected as approximately representative) surpasses a certain threshold value. In a navigation application, the search process could operate e.g. on the following sources if the expressiveness of the query is below a certain threshold:

the map database segment where only important cities and airports are considered, a user's favorite destination list, a supplementary database of abbreviations for certain map objects (for instance, cities abbreviated with the code the authorities use on vehicle registration plates).

Herein, not the search query string's length per se is used to decide about the inclusion of database sources or segments in the search process, but the expressiveness of the search string. The expressiveness is not strictly correlated to the query length: A short query like XYZ which rarely occurs in the database is nevertheless highly expressive, while a rather long query like BAHNHOFSTRASSE has relatively low expressiveness because a street of this name exists in many thousands of cities. The method described here enables to efficiently obtain an estimate of the expressiveness of a given search word—it is inversely correlated with the size of its (general) candidate set.

Self-learning fast search of frequently-selected favorite results:

There may be database objects which a user searches relatively often, corresponding in a navigation application for instance to destinations the user visits frequently. In order to shorten the interaction for retrieving such objects, the following method is used:

Each time the user selects an object from the result list and hands it over to further processing in the application (e.g. selection of a destination and start of route computation in a navigation application), the selected object is registered in a persistently stored list of favorite results. The list is stored on a per-user basis—if the surrounding system or application supports multiple users, there will be multiple persistent lists. The list can either store references to database objects, or result attributes which uniquely characterize the target object (as generally used in the search result list).

The favorite list is then integrated into the generalized search process as an external database, and is included from the earliest stages of query input on by the expressiveness-guided database source selection process described above.

Word-level fuzzy matching and associative search:

The search space reduction techniques described above operate on the level of tile sets. This means that a candidate set is guaranteed, for each search pattern in the query, to contain some object matching this pattern (and doing so in the role specified for the interpretation that yielded this candidate set), but there is no guarantee that there exists one single object matching all input search patterns at the same time. Actual matches are identified in the exhaustive search and string matching phase, and very often, objects encountered during this phase only match some of the input search patterns.

Instead of disregarding these incomplete matches, they may be treated as follows:

a certain number of non-matching words is considered as acceptable, if some additional requirements are fulfilled (e.g., at least one match on the name attribute of the object must exist), incomplete matches are marked in the result list with their extent of incompleteness (i.e. the number of search words which did not yield a match), this extent is taken into account in the result ranking in a way that incomplete matches do not "push aside" any complete matches found, and/or incomplete matches are specially marked when presenting the result list so the user immediately recognizes them and knows they are not complete.

This technique provides a basic associative search function, as follows: If the user enters two search patterns the combination of which by way of example does not match any individual database object completely, but which refer to two objects which are situated within the same map tile and if this combination only occurs in one or a small set of map tiles, one of the candidate sets computed during the search space reduction phase will contain this tile, and the word-level fuzzy matching will identify both of the referred objects and register them as word-level fuzzy results.

By this it for example, becomes possible that the query "NEUE OSTKR" retrieves the street "NEUE BAHNHOF-STRASSE". This object does not match the input search pattern "OSTKR", but is located in the same tile as (and thus near) the train station OSTKREUZ in Berlin, Germany.

In a further refinement, the method amends the individual candidate sets before computing the combined candidate set, by including neighboring tiles. This enables the associative search to find combinations of objects which are not located within one and the same tile, but within two neighboring tiles.

Alternative input methods:

Using input methods such as voice input or handwriting recognition together with search features can be attractive in different application contexts. Such input methods and associated software usually generate a textual representation of the user's utterance, which can be used in text search methods of the type described herein.

Using the method described herein, the use of set computations opens up additional avenues for integration with such input methods: As these methods are usually based on probabilistic methods, they often do not just deliver single output texts but ranked variant lists.

Figure 9:
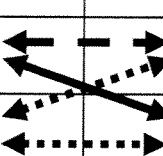
FIG. 9 shows a schematic illustration of applying the method described herein in a context where the user inputs the query through a voice input subsystem.

As illustrated for example in FIG. 9, a user may by voice input enter two words which the systems interprets, as the highest-ranked result, as "Köln" (slot1) and "Bremerhaven" (slot 2). Each word herein is assigned a so called slot. In this case it was not possible to unambiguously identify the user's voice input, and therefore a second-ranked result is "Mölln" (slot1) and "Römerhaven" (slot2). The probabilities the voice input system has determined are indicated as 0.7 vs. 0.3 for the results in slot 1 and 0.6 vs. 0.4 for the results in slot 2.

As the best-ranked result in each slot is not guaranteed to represent the actual user utterance, any combination of results from the different slots can represent the actual spoken search query.

The candidate set computations employed in the method described herein can easily rule out many of the possible combinations, as shown in FIG. 9: intersecting the (definite) candidate sets for a pair of slots may yield an empty set (indicated by the dotted arrow), so no match with this combination of search patterns exists in the database. That means, by only computing and intersecting candidate sets, half of the possible slot combinations have been eliminated. The two nonempty combined candidate sets contain two matches of different quality: "KÖLN RÖMERHAFEN" is an exact match (illustrated with a continuous arrow in FIG. 9). "KÖLN BREMERHAVEN" just yields a prefix match (BREMERHAVENER STRASSE), illustrated in FIG. 9 with a dashed arrow. If the user can be expected to always utter complete words rather than prefixes, the set computation can be done using role-specific candidate sets using the "exact" role, in which case the combination "KÖLN BREMERHAVEN" will, too, yield an empty combined candidate set—i.e. all incorrect combinations have been eliminated on set computation level.

Generally, a considerable number of combinations of slot entries can easily be eliminated from further consideration with very low computational cost that way.

Use of a super-index:

The search method described herein can also be used for media player and set-top box applications, for easy search-based access to large collections of media data, the metadata of which can be indexed using the search method. As media data do not have a natural geometrical embedding, they can be assigned an artificial tile number.

Media players and remote controls for set-top boxes often have very limited keyboards, so the techniques described in the preceding sections for using reduced keyboards can be advantageous.

Possibly, in a refinement in this context, some or all of the metadata information that need to be moved to the media player device can be drawn from a central database. This may be done for example for music files, most of which in some way stem from compact discs which have been published and (in most cases) have been registered in global databases. It becomes thus possible to build a super-index from a global database and use this super-index for searching the small subset of media files actually installed on the device. As a prerequisite, the locally installed files must be registered so the files associated to a given tile number can easily be accessed. This may be done by sorting them into a simple trie-shaped index structure. After computing the artificial tile number, the findability of the media file is probed using the super-index: a search query constructed from the media file's metadata must yield a candidate set containing the artificial tile number. If this is not the case, the media file is unknown to the global database. For cases like this, a small auxiliary database may be kept on the device and integrated into the search process.

The invention is not limited to the embodiments described above. For example, the invention is not limited to implementations of navigating in a two-dimensional plane, but may be applied also to a three-dimensional space that is partitioned by an octtree rather than a quadtree, as perceivable for aerospace or aeronautics applications, or may be applied to one-dimensional search spaces (e.g. the pages in an e-book).

As already described for the media player scenario above, the method may also be used in applications where the original database objects do not have spatial references at all, by creating an artificial spatial embedding of the original data, i.e. by assigning each data object a synthetic position in a k-dimensional space.

The method may also be applied in a networked or connected scenario where query input, result presentation, and execution of the search process are not necessarily done on one and the same computing device, but may be distributed among several computing devices which are connected through a network and/or through other bidirectional or unidirectional communication links. An example is an internet-based application where the search query is entered by the user in an input field that is shown on a web page displayed in a web browser, the query is then communicated to a server where the instant method is executed, and the results are communicated back over the network and are displayed in a dynamic part of said web page. Another example is a media center device having a remote control using an infrared communication link, where the instant method is executed on the media center device in order to enable searching for names and textual descriptions attached to media files or channels, the keypad on the remote control is used by the user to enter search queries, and a TV set attached to the media center device is used to display results to the user.

The invention claimed is:

1. A method for searching objects in a database by means of an index data structure which associates object attribute values to collections of spatial elements—for example tiles of a quadtree or cuboids of an octtree—defined to partition a space, especially a two-dimensional plane or a three-dimensional space, herein a predefined number of spatial elements being combinable to a next-level spatial element, the method comprising:
searching the index data structure for a first input search pattern and, if the first input search pattern is associated to a first collection of spatial elements through the index data structure, including all spatial elements from the first collection into a first candidate set of spatial elements, wherein, if the number of spatial elements in the first candidate set exceeds a certain limit, some or all of the spatial elements are combined to a reduced number of next-level spatial elements;
searching the index data structure for a second input search pattern and, if the second input search pattern is associated to a second collection of spatial elements through the index data structure, including all spatial elements from the second collection into a second candidate set of spatial elements, wherein, if the number of spatial elements in the second candidate set exceeds a certain limit, some or all of the spatial elements are combined to a reduced number of next-level spatial elements;
forming, from the first candidate set and the second candidate set, a combined candidate set of spatial elements;
searching, in the combined candidate set of spatial elements, for objects that match the first input search pattern and the input second search pattern to obtain a set of result objects
wherein in the combined candidate set formed from the first candidate set and the second candidate set some or all of the spatial elements are combined to a reduced number of next-level spatial elements if the number of spatial elements in the combined candidate set exceeds a predefined threshold value.

2. The method according to claim 1, wherein the combined candidate set is formed from the first candidate set and the second candidate set by forming the intersection of the first candidate set and the second candidate set.

3. The method according to claim 1, wherein the index data structure associates object attribute values with spatial elements of a quadtree, each spatial element corresponding to a portion of a two-dimensional plane, and wherein four adjoining tiles are combinable to one next-level tile representing a next-level spatial element, wherein in particular, for the combination of spatial elements within the first candidate set or within the second candidate set of spatial elements, four or less adjoining tiles are combined to one next-level tile, this combination representing a secure compactification in which the area of the next-level spatial element represents a superset of the combined spatial elements.

4. The method according to claim 1, wherein, during the searching of the index data structure for the first input search pattern or the second input search pattern that each represent a sequence of data elements, especially a text string, it is examined whether the first input search pattern or the second input search pattern matches a prefix of an attribute value of an object of a spatial element.

5. The method according to claim 1, wherein, for the searching of an input search pattern in the index data structure, an auxiliary index data structure is used which associates object attributes or prefixes of object attributes to auxiliary candidate sets that have been assembled previously, especially through the index data structure, and, if the searching in the auxiliary index data structure yields a nonempty set, this set constitutes the desired candidate set, otherwise the desired candidate set is obtained by searching the index data structure for the input search pattern.

6. The method according to claim 1, wherein, when interactively inputting the first input search pattern and/or the second input search pattern, the combined candidate set is incrementally reduced.

7. The method according to claim 1, wherein, when interactively inputting the first input search pattern and/or the second input search pattern, a feedback about the expressiveness of a candidate set influenced by the input search pattern is provided, wherein the expressiveness increases if the cardinality of the candidate set decreases, wherein, for example, a feedback is provided if the cardinality of the candidate set is smaller than a predetermined threshold value and/or an error is indicated if the cardinality of the candidate set assumes a value of zero.

8. The method according to claim 1, wherein the searching for objects in the combined candidate set of spatial elements is carried out when the cardinality of the combined candidate set becomes smaller than a predetermined threshold value, and the result objects are output via an output device.

9. The method according to claim 1, wherein, during the searching for objects in the combined candidate set of spatial,
the number of spatial elements that have already been searched is counted and the process is stopped when a pre-defined limit is surpassed or
the number of objects that have already been found is counted and the process is stopped when a pre-defined limit is surpassed or
the elapsed time for the searching is measured and the process is stopped when a pre-defined time limit is surpassed.

10. The method according to claim 1, where the search is constrained to consider only spatial elements associated with a specific target region.

11. The method according to claim 1, wherein the relevance of the objects is determined according to a set of heuristic rules indicating the probability that an object of the set of result objects represents an object a user actually meant to find, and wherein the results are displayed to the user in an order of decreasing relevance.

12. The method according to claim 1, wherein the database contains map data of a navigation device, the objects corresponding to geographic objects of the map data and the two-dimensional plane corresponding to a geographical map to be displayed by the navigation device that is partitioned by the spatial elements, wherein in particular, when interactively inputting the first input search pattern and/or the second input search pattern, a geographical area corresponding to the combined set of spatial elements is output, especially in an incremental manner during the interactive input.

13. The method according to claim 1, wherein the first input search pattern and/or the second input search pattern are input via a reduced keypad, especially a numeric keypad, in which multiple letters and/or digits are assigned to a key of the keypad, wherein each key has to be pressed only once per character of the input search pattern.

14. The method according to claim 1, wherein the first input search pattern and/or the second input search pattern are heuristically interpreted to have each a selection of certain pre-defined roles, a role herein indicating a possible underlying meaning of the respective input search pattern, wherein in particular by heuristically interpreting the first input search pattern and/or the second input search pattern a role-specific heuristic candidate set is computed for each input search pattern, and by intersecting the role-specific heuristic candidate sets a combined heuristic candidate set for a specific interpretation of a search query is obtained.

15. The method according to claim 14, wherein in a first step for several different interpretations of a search query in each case a combined heuristic candidate set is computed and exhaustively searched, and in a second step the combined candidate set without constraining the search query to a specific interpretation is computed and exhaustively searched, wherein in particular the different interpretations are first enumerated symbolically without computing the associated role-specific heuristic candidate sets and combined heuristic candidate sets, wherein those interpretations are not further considered for which one or more of the role-specific heuristic candidate sets are detected to be empty through a look-up in the index data structure.

16. The method according to claim 15, where the selection of different interpretations to be considered for an input search pattern, or the symbolical enumeration of the different interpretations, are determined according to the estimated cardinality of one or more role-specific heuristic candidate sets obtained through a lookup in an index data structure.

17. The method according to claim 1, wherein an auxiliary index data structure is employed to provide pre-compactified candidate sets for certain input search patterns, the auxiliary index data structure always being probed before the main index data structure is employed.

18. The method according to claim 1, wherein candidate sets and combined candidate sets are stored in a cache memory database after they have been first computed for a given input search pattern.

19. The method according to claim 1, wherein the index data structure has entries not only for the exact values of an object attribute, but additionally for predefined variations of these values, which may substitute certain characters by other characters or may add certain characters to the original value or may omit certain characters from the original value or may exchange the positions of some characters with respect to their positions in the original value.

20. The method according to claim 1, wherein the first and the second candidate set for the first and the second input search pattern are extended by including spatial elements into the first and second candidate set that geometrically adjoin the spatial elements already present in the first and second candidate set before the first and the second candidate set are combined.

21. The method according to claim 1, wherein the first and second search pattern are input through a medium such as a voice input device yielding a multitude of search query variants each consisting of several input search patterns instead of a single search query, and wherein the estimated cardinality of candidate sets computed for search patterns from the search query variants through a lookup in an index data structure or the cardinality of combined candidate sets computed for search query variants is used to guide the selection of a subset of search query variants for further processing or to guide the assignment of priorities to the individual search query variants influencing the order of their further processing.

22. The method according to claim 1, wherein the estimated cardinality of one or more candidate sets, obtained through a lookup in an index data structure, is used as a measure of expressivity of an input search pattern or multitude of input search patterns.

23. The method according to claim 1, wherein the user's final selection of a search result is registered in a persistent storage medium to be used for future search processes.

24. The method according to claim 1, wherein as results of the exhaustive search of the combined candidate set of spatial elements not only objects are registered whose attributes match all input search patterns of the input search query, but also such objects for which one or more input search patterns do not match an object attribute.

25. The method according to claim 1, wherein the index data structure and the associated collections of spatial elements are not generated from the database which will actually be searched using the index data structure, but from a larger database which contains all or most of the objects of the database that will actually be searched.

26. The method according to claim 1, wherein the presence or absence of a given word in an index data structure, or the estimated cardinality of one or more associated candidate sets, obtained through a lookup in an index data structure, or the cardinality of one or more combined candidate sets is used to identify and/or correct mistyped search patterns and/or to evaluate automatically-generated modifications of a user-specified search pattern intended to transform a mistyped search pattern back into a valid search pattern.

27. The method according to claim 1, wherein a synthetic spatial position value is associated to each database object as a function of existing database object attribute values in order to enable searching of non-spatial databases.

28. The method according to claim 1, using a system consisting of one or more computing devices arranged to execute the method and acting as servers, and one or more computing devices acting as clients, wherein each client is configured to accept search queries as user input and/or to communicate search results back to one or more users, and each client is permanently or intermittently connected to the servers through a network, such as the Internet, or through a unidirectional or bidirectional communication link, such as a radio or infrared transmission.

29. A computing device, especially mobile computing device, such as a navigation device, which is arranged to run a method according to claim 1.

30. The method according to claim 1, wherein in the combined candidate set formed from the first candidate set and the second candidate set some or all of the spatial elements are combined to a reduced number of next-level spatial elements if the number of spatial elements in the combined candidate set exceeds a predefined threshold value.

* * * * *